United States Patent [19]
Watanabe et al.

[11] Patent Number: 5,349,274
[45] Date of Patent: Sep. 20, 1994

[54] BI-DIRECTIONAL SCAN CIRCUIT

[75] Inventors: Junzo Watanabe, Kanagawa; Akihiro Ueyama, Tokyo; Ban Kawamura, Kanagawa, all of Japan

[73] Assignee: Sony Corporation, Tokyo, Japan

[21] Appl. No.: 65,156

[22] Filed: May 21, 1993

[30] Foreign Application Priority Data

| May 25, 1992 | [JP] | Japan | ................... | 4-158719 |
| May 29, 1992 | [JP] | Japan | ................... | 4-163864 |
| May 29, 1992 | [JP] | Japan | ................... | 4-163865 |

[51] Int. Cl.$^5$ .................... G09G 1/04; H01J 29/70
[52] U.S. Cl. .................... 315/395; 315/371; 315/391; 315/396
[58] Field of Search ............ 315/391, 395, 396, 397, 315/408, 371

[56] References Cited

U.S. PATENT DOCUMENTS

| 3,144,580 | 8/1964 | Bridges et al. | .................... | 315/396 |
| 4,206,388 | 6/1980 | Ishigaki et al. | .................... | 315/371 |
| 4,242,714 | 12/1980 | Yoshida et al. | .................... | 315/371 |
| 4,654,940 | 1/1987 | Groeneweg et al. | ................ | 315/408 |
| 4,956,585 | 9/1990 | Rilly . | | |

FOREIGN PATENT DOCUMENTS 0141256 5/1985 European Pat. Off. .
0285114 10/1988 European Pat. Off. .

OTHER PUBLICATIONS

"Horizontal-Ablenkschaltung mit modulierter S-Korrektur", Neues aus der Technik, Dec. 15, 1989, No. 4, at 1, Col. 1 (Vogel Verlag, Würzburg, Germany).

Primary Examiner—Gregory C. Issing
Attorney, Agent, or Firm—Lewis H. Eslinger; Jay H. Maioli

[57] ABSTRACT

In a dual direction horizontal bi-directional scan circuit, deterioration of the picture quality is prevented, while linearity is improved without supplying wasteful deflecting current, and pin distortion is corrected. The deflecting current in the going scan and in the returning scan are supplied to each deflecting coil by first and second resonance circuits, and capacitors substantially the same in capacitance are provided in the first and second resonance circuits to bias the deflecting voltage so that the terminal voltage and the power source voltage of the capacitors are synchronized to the vertical synchronizing signals to produce a parabolic modulation.

11 Claims, 17 Drawing Sheets

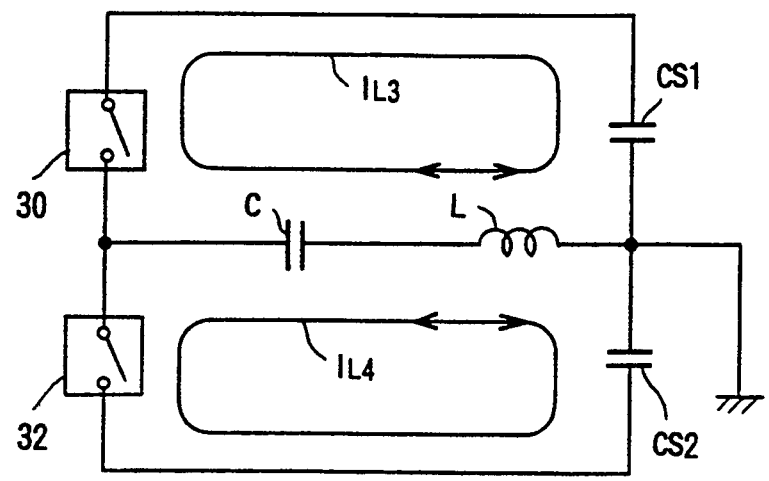
FIG. 11
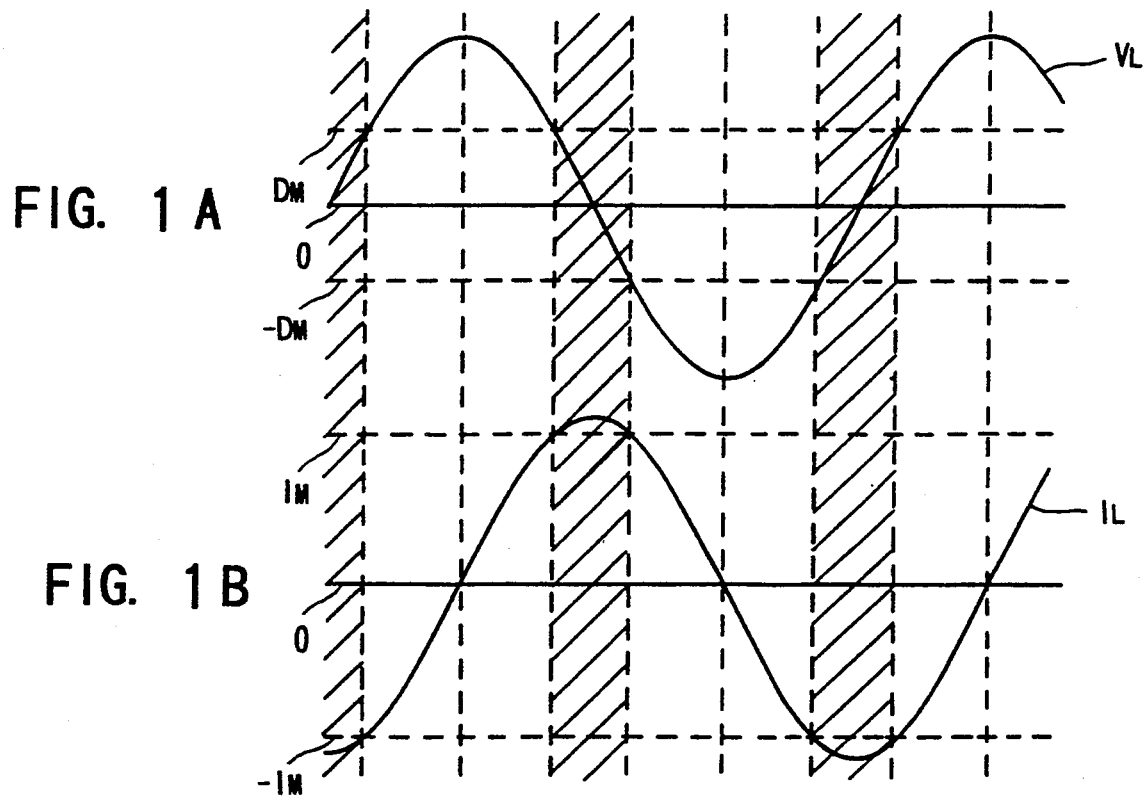
FIG. 1A
FIG. 1B

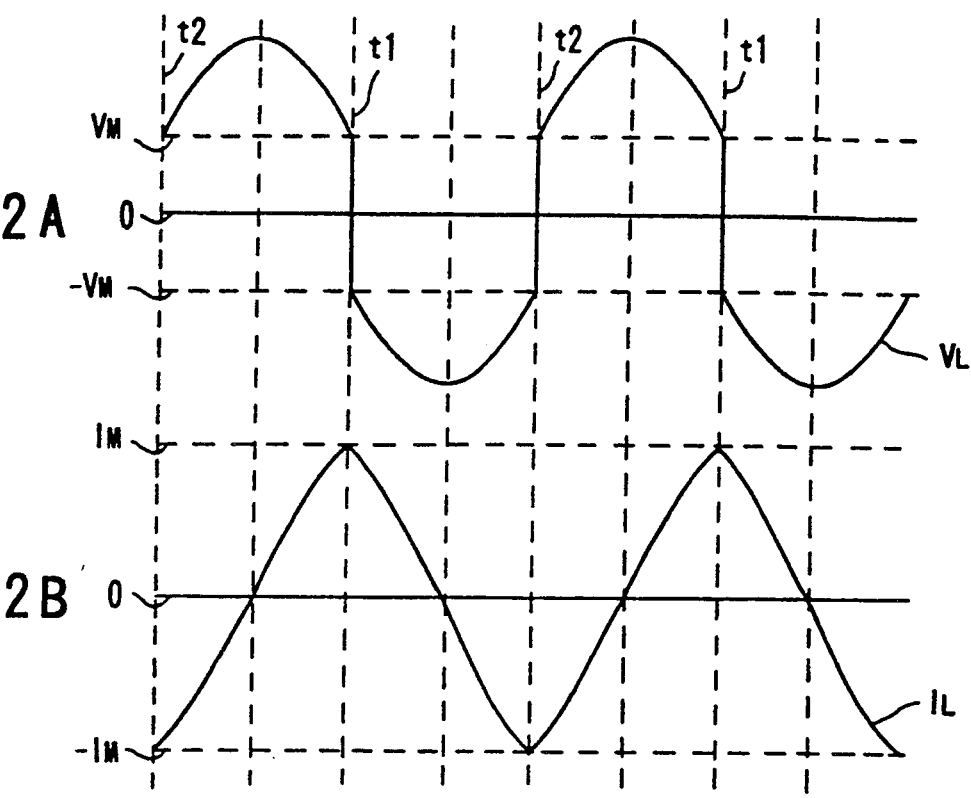
FIG. 2A
FIG. 2B
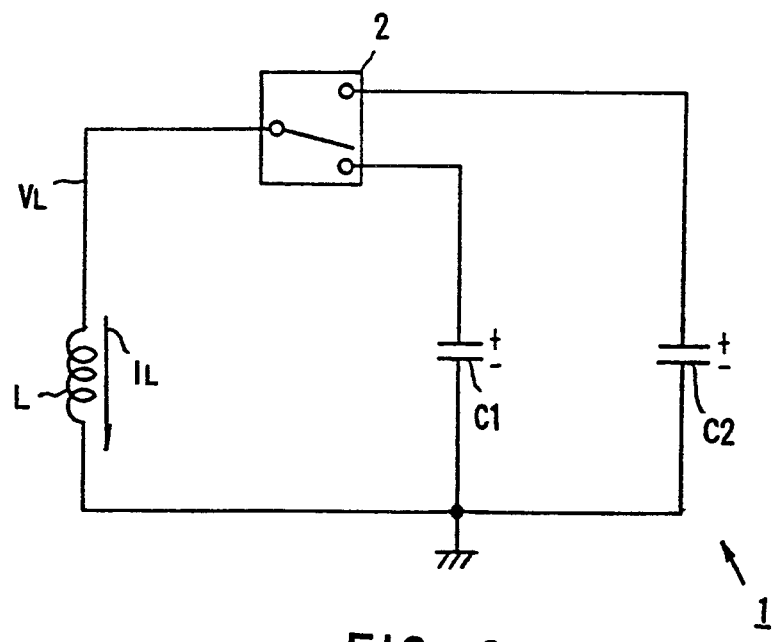
FIG. 3

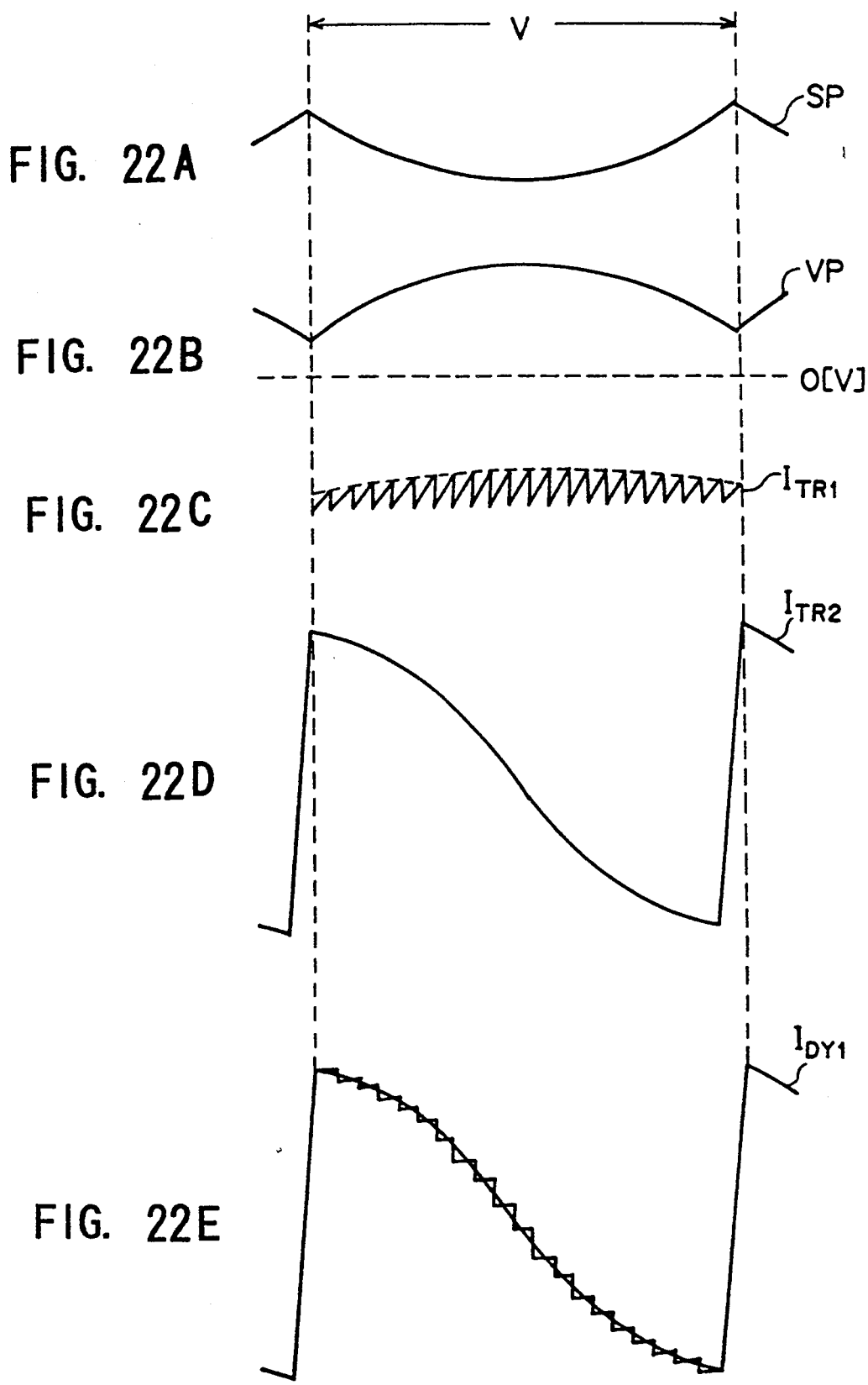

BI-DIRECTIONAL SCAN CIRCUIT

BACKGROUND OF THE INVENTION

FIELD OF THE INVENTION

The present invention relates to a bi-directional scan circuit, and more particularly is suitable to apply for a horizontal bi-directional scan circuit of a dual direction deflection circuit.

Heretofore such type of a deflection circuit, (hereinafter, referred to as "a deflection circuit of a bi-directional scan circuit") has been proposed in U.S. Pat. No. 4,672,449, in which a horizontal deflection coil is driven by using drive signals such as sine-wave signals, the signal level of which changes symmetrically before and after the predetermined point of time.

With the deflection circuit, a display image can be formed by means of either a scan running from left to right in a display (hereinafter, referred to as "going scan") or a scan running inversely from right to left in the display (hereinafter, referred to as "returning scan"), so that the deflecting frequency can be reduced to $\frac{1}{2}$.

In this deflection circuit, there can be prevented a sudden change of the deflecting current which generates saw-tooth signals, so as to reduce unnecessary radiation etc. and leads of elements of the deflection circuit.

Especially if the deflection circuit is composed of a resonance circuit and the deflection coil is driven by a sine-wave current as shown in FIGS. 1A and 1B, the electric power for required deflecting can be reduced by a simple constitution as discussed in U.S. Pat. No. 5,051,668.

However, when the deflection coil is driven by a pure sine-wave current, linearity of the deflecting current $I_L$ deteriorates during the peak period thereof shown by slant lines in FIGS. 1A and 1B. Above all, this drives the deflection coil to overscan, therefore there is a problem of supplying wasteful deflecting current $I_L$ during the period of the slant lines.

In practice, when a conventional 34-inch cathode-ray tube is used, the period of the slant lines corresponds to approximately 38 [%] of the whole period, and the deflecting current $I_L$ corresponding to approximately 17 [%] in amplitude is supplied wastefully.

As one method for solving this problem, the time base of the video signal is controlled so that there is a method for improving the linearity without supplying wasteful deflecting current $I_L$.

However, this method complicates the constitution of the video signal processing circuit and the beam current needs to be changed in accordance with the control of time base for keeping the brightness of the whole display constant. Thus, this makes the whole constitution complicated.

Besides, there is a problem of the change of beam shape etc., by the change of the beam current.

On the other hand, as shown in FIGS. 2A and 2B, there is a method in which the deflecting current $I_L$ is applied in order to delete the wasteful portion.

In this method, where the deflection coil is driven in accordance with the operating principle shown in FIG. 3, the deflection coil L can be driven by such deflecting current $I_L$.

In the deflection circuit 1 of FIG. 3, a capacitor C1 is connected to the deflection coil L via a selecting circuit 2, so that the resonance circuit is composed of the capacitor C1 and the deflection coil L.

If left alone in this state, in the deflection coil L, the deflecting current of a sine-wave shape flows. If this resonance circuit has no loss, the deflecting current continuously flows with no attenuation.

With respect to the deflecting current $I_L$ changing in the above manner, when the terminal voltage of the deflection coil L falls to the predetermined voltage $V_M$ at the point of time t1, the contact of the selecting circuit 2 of the deflection circuit 1 is switched to the capacitor C2 side.

Here, if the capacitance of capacitors C1 and C2 is equal, and the capacitor C2 is charged to a voltage $-V_M$, the deflecting voltage $V_L$ drastically falls to the voltage $-V_M$ from the voltage $V_M$ at the point of time t1, and changes in a sine-wave shape from this voltage $-V_M$ thereafter.

With respect to the deflecting voltage $V_L$ changing in a sine-wave shape, when the deflecting voltage $V_L$ continuously rises to the voltage $-V_M$ at the point of time t2, the contact of the selecting circuit 2 of the deflection circuit 1 is switched.

Thus, the deflection coil L is connected to the capacitor C1 which is separated from the capacitor C2 and is kept to the voltage $V_M$. The deflecting voltage $V_L$ rises to $V_M$ from the voltage $-V_M$, and changes in a sine-wave shape thereafter.

By this operation, two capacitors C1 and C2 are alternately switched at the predetermined timing and are connected to the deflecting coil L, and the voltage $V_M$ and $-V_M$ on switching are set to a predetermined value, so that the linearity can be improved without supplying wasteful deflecting current.

As a matter of fact, this type of deflecting current $I_L$ can be formed by the deflection circuit 4 as shown by an equivalent circuit in FIG. 4.

That is, the deflection circuit 4 is composed of the resonance circuit with the capacitor C and the deflecting coil L connected to each other via the selecting circuit 6.

In the deflection circuit 4, the contact of this switching circuit 6 is switched to insert the direct-current power source 8 of a voltage $2V_M$ into the resonance circuit during the period that the deflecting voltage $V_L$ rises above the voltage $-V_M$ the period being from the point of time t2 to t1 in FIGS. 2A and 2B.

Thus, during the period from the point of time t2 to t1, the direct-current level of the deflecting voltage $V_L$ is shifted by the voltage $2V_M$ and the deflecting coil L can be driven with the deflecting voltage $V_L$ shown in FIGS. 2A and 2B.

Concretely, as shown in FIG. 5, the selecting circuit 6 (FIG. 4) is provided with a semiconductor switch corresponding to resonance part 10 having the capacitor C and the deflecting coil L, so that an energy supplying part 12 is connected to supplement for the loss of the resonance part 10.

That is, the deflection circuit 14 connects the series circuit of the field-effect transistors Q3 and Q4 in parallel with the DC power source VB. The voltage $V_a$, the driving power, is supplied from a connection node between the field-effect transistors Q3 and Q4 via the capacitor C3 and the coil L1.

In the deflection circuit 14, as shown in FIGS. 6A to 6M, the field-effect transistors Q3 and Q4 alternately are switched in on or off state. By this operation, the voltage $V_a$ of the connection node between the field-effect transistors Q3 and Q4 rises (FIG. 6C) at the cycle synchronizing with the deflecting voltage $V_L$ and the deflecting current $I_L$ (FIGS. 6A and 6B) of the deflecting coil L and then the driving power is supplied.

Further, in the deflection circuit 14, the series circuit of the field-effect transistors Q1 and Q2 is connected in parallel with the AC power source 8, and then the diodes D1 and D2 are connected in parallel with these field-effect transistors Q1 and Q2 respectively.

Furthermore, the capacitor C of the resonance part 10 is connected to the node between these field-effect transistors Q1 and Q2 of the selecting circuit 6 which is composed of the field-effect transistors Q1 and Q2, and the diodes D1 and D2.

In this construction, the deflection circuit 14 keeps the field-effect transistor Q2 connected to the ground in the on state so that the series resonance circuit of the deflecting coil L and the capacitor C is formed and the resonance current flows to the deflecting coil L. On the contrary, the field-effect transistor Q2 connected to the DC power source 8 is kept in the on state so that the power of the DC power source 8 can be supplied to the series resonance circuit of the deflecting coil L and the capacitor C.

By switching the connection of the selecting circuit 6 at the point of time t1 and t2, in the deflection circuit 14, the deflecting coil L can be driven with the condition as described above with FIG. 4.

In the deflection circuit 14, the timing at which the field-effect transistors Q1 and Q2 are switched to the off state is controlled to switch the connection of the entire selecting circuit 6.

That is, when the deflecting voltage $V_L$ arises to the voltage $-V_M$ at the point of time t2, the field-effect transistor Q2 is switched to the off state (FIG. 6G).

Hence, in the deflection circuit 14, the voltage Vb of the node between the field-effect transistors Q1 and Q2 (FIG. 6H) rapidly rises with the deflecting current $I_L$, and the diode D1 changes immediately to the on state (FIG. 6D), and then the connection of the switching circuit 6 can be changed to the DC power source 8 side from the ground side.

When the field-effect transistor Q1 is switched on thereafter, the deflecting voltage $V_L$ rises to the voltage $V_M$ at the point of time t1, so that the field-effect transistor Q1 is switched to the off state (FIG. 6E).

Thus, the voltage Vb of the node of the field-effect transistors Q1 and Q2 rapidly rises with the deflecting current $I_L$, and the diode D2 is immediately switched on (FIG. 6F) to switch the connection of the switching circuit 6 from the power source 8 side to the ground side.

Thus it can be recognized that the power supplied from the DC power source 8 to the deflection circuit 14 is only a little.

When the diode D1 switches on, the current flows out of the DC power source 8 therethrough. On the contrary, when the field-effect transistor Q1 switches on and the voltage Vb of the connection node starts to drop, the current flows in the direct-current power source 8 through this field-effect transistor Q1.

If the value of this current is different in charging and in discharging the deflecting current $I_L$ on the going scan and on the returning scan becomes different; so that the display picture becomes unsightly.

For this reason, as shown in FIG. 7 with the accompanying circuit, even if the DC power source 8 is replaced with a capacitor CS, the deflecting coil L will be driven by the deflecting current $I_L$ as described in FIG. 2.

Here, in the deflection circuit 20, the deflecting voltage $V_L$ is detected in the voltage detecting circuit 22, and based on the detected result, the field-effect transistors Q3 and Q4 are driven by means of the driving circuit 24.

Further, the detected result of the voltage detecting circuit 22 is outputted to an AFC circuit 26, and then the field-effect transistors Q1 and Q2 are driven by the driving circuit 28 on the basis of the result of the comparison of the horizontal synchronizing signal SYNC with the voltage detecting result, so that the whole operation of the deflection circuit 20 is synchronized with the horizontal synchronizing signal SYNC.

Furthermore, a pin-distortion correcting circuit 29 is connected to the capacitor CS to change the terminal voltage of the capacitor CS in synchronizing with the vertical synchronizing signal in a parabolic shape. Thus, the pin-distortion is corrected.

In this way, in accordance with the constitution shown in FIG. 7, the linearity of the image can be improved without supplying wasteful deflecting current; moreover, with the replacement of the DC power source 8 with the capacitor CS, the general construction can be simplified.

In this construction, however, there is the problem that the deflecting current $I_L$ slightly changes between the going scan and the returning scan, therefore the picture quality of the display is deteriorated corresponding to the changes of deflecting current.

That is, as shown in FIG. 8, the deflection circuit 20 can be represented, as an equivalent circuit, by replacing the field-effect transistor Q1 and the diode D1 with the switching circuit 30 and by replacing the field-effect transistor Q2 and the diode D2 with the switching circuit 32.

As shown in this equivalent circuit, in the deflection circuit 20, when the switching circuit 30 is switched on, the capacitor CS forms a part of the resonance circuit. On the contrary, when the switching circuit 32 is switched on, the capacitor CS is disconnected from the resonance circuit.

Hence, in the deflection circuit 20, the resonance frequencies in the going scan and in the returning scan differ from each other to present various changes in deflecting current between in the going scan and in the returning scan.

In this case, as shown in FIG. 11, the displayed positions of picture portions in the going scan and the returning scan differ from each other, and this results in a problem that the display becomes unseemly.

As a method to solve this problem, it is possible to increase the capacitance of this capacitor CS, however, if the capacitance of this capacitor CS is increased, the correction of the pin-distortion becomes difficult and this is not practical.

SUMMARY OF THE INVENTION

In view of the foregoing, an object of this invention is to provide a bi-directional scan circuit for avoiding the distortion of the picture quality and improving the linearity without supplying wasteful deflecting current.

The foregoing object and other objects of the invention have been achieved by the provision of a bi-direction scan circuit, according to the first aspect of the invention, comprising: a first resonance circuit supplying the deflecting current $I_{L3}$ in the going scan to a horizontal deflection coil L and a second resonance circuit supplying the deflecting current $I_{L4}$ in the returning scan to the horizontal deflection coil L; wherein, the first resonance circuit is a parallel resonance circuit composed of the first switching circuit 30 being repeatedly switched on and off at the predetermined timing, a resonance capacitor C, a horizontal deflection coil L and a first capacitor CS1 for forming the DC power source; the second resonance circuit is a parallel resonance circuit composed of the second switching circuit 32 being repeatedly switched on and off complementarily with the first switching circuit 30 repeatedly, the resonance capacitor C, the horizontal deflection coil L and a second capacitor CS2 forming the DC power source; the first and second capacitors CS1 and CS2 forming DC power source are set to the values being much the same, and the first switching circuit 30 switching on and off repeatedly at the cycle less than a half in comparison with one cycle of the resonance frequency of the first and second resonance circuit.

Further, according to the aspect of the second invention, the first switching circuit 30 is composed of a parallel circuit of the first transistor Q1 and the first diode D1, and the second switching circuit is composed of a parallel circuit of the second transistor Q2 and the second diode D2.

Furthermore, according to the third aspect of the invention, the first and second transistor Q1 and Q2 are switched on and off based on the driving signals supplied from the predetermined driving circuits 22 and 28, and the driving circuits 22 and 28 supply the driving signal based on the voltage $V_L$ of the connection node between the resonance capacitor C and the horizontal deflection coil L.

Further, according to the fourth aspect of the invention, the first and second resonance circuits input the driving power $V_a$ to the connection node between the resonance capacitor C and the horizontal deflection coil L from the predetermined power source circuit 22, 24, VB, Q3 and Q4, via the series circuit for power supplying capacitor C3 and the coil L1; the signal level of the driving power $V_a$ is varied synchronizing with on-off operation of the first and second switching circuits 30 and 32.

Furthermore, according to the fifth aspect of the invention, the power source circuit 22, 24, VB, Q3 and Q4 is constructed such that the third and fourth transistors Q3 and Q4 are connected in series between the DC power source VB and the ground; the third and fourth transistors Q3 and Q4 are switched alternately on and off based on the voltage $V_L$ of the connection node between the resonance capacitor c and the horizontal deflecting coil L, so that the driving power $V_a$ is generated to vary the signal level synchronizing with the on and off operation of the first and second switching circuits 30 and 32.

In the construction of the first to fifth aspects of the invention, the first and second DC power source capacitors CS1 and CS2 are provided in the first resonance circuit which supplies the deflecting current $I_{L3}$ in the going scan to the horizontal deflection coil L and the second resonance circuit which supplies the deflecting current $I_{L4}$ in the returning scan to the horizontal deflection coil L; the values of the DC power source capacitors CS1 and CS2 are selected to be equal to each other so as to make equal to each other the change of the deflecting currents $I_{L3}$ and $I_{L4}$ in the going scan and the returning scan; and moreover, the first switching circuit 30 is switched on and off at a cycle less than a half cycle in comparison with one cycle of a resonance frequency of the first and second resonance circuit, and the second switching circuit 32 is switched on and off such as to change complementarily for the above operation, so that the linearity can be improved without supplying wasteful deflecting current.

Here, the first and second switching circuits 30 and 32 are composed of the parallel circuits of the transistors Q1 and Q2, and the diodes D1 and D2, so that the switching circuits 30 and 32 are easily on-off controlled by means of the on-off control of the transistors Q1 and Q2.

Further, this on-off control is performed on the basis the voltage $V_L$ of the connection node between the resonance capacitor C and the horizontal deflection coil L so that the switching circuits 30 and 32 can be on-off controlled certainly and easily.

The driving power source $V_a$, the signal level of which is varied synchronizing with the on-off switching operation of the first and second switching circuits 30 and 32, is inputted to the connection node between the resonance capacitor C and the horizontal deflection coil L via the series circuit of the capacitor C3 and the coil L1 for power supplying so that an electric power of the first and second resonance circuits can be supplied.

In this power source circuit, the third and fourth transistors Q3 and Q4 are connected in series between the DC power source VB and the ground, and the third and fourth transistors Q3 and Q4 are alternately switched on and off based on the voltage $V_L$ of the connection node between the resonance capacitor C and the horizontal deflection coil L, so that the driving power $V_a$ can be generated such that the signal level is switched synchronizing with the on-off switching operation of the first and second switching circuits 30 and 32 with a simple construction.

Furthermore, in order to solve the above problems, according to the sixth aspect of the invention, a bi-directional scan circuit comprises: a power source circuit 24, 36, Q3 and Q4 supplying a driving power $V_a$ to the first and second resonance circuits via the series circuit of a power supplying capacitor C3 and a coil L1, and a first and second pin-distortion correcting circuits 34 and 35 correcting the pin distortion of a horizontal deflection coil L; the first resonance circuit is a parallel resonance circuit composed of the first switching circuit 30 being repeatedly switched on and off at the predetermined timing, a resonance capacitor C, a horizontal deflection coil L and a capacitor CS1 forming the first direct-current power source; the second resonance circuit is a parallel resonance circuit composed of a second switching circuit 32 being repeatedly switched on and off complementarily with the first switching circuit 30, the resonance capacitor C, the horizontal deflection coil L and a second capacitor CS2 forming the DC power source which has much the same capacitance as the first capacitor CS1 forming the DC power source: the first pin-distortion correcting circuit 34 modulates the terminal voltage V1 of the first capacitor CS1 forming a DC power source with the first pin-distortion correcting signal SP1 the signal level of which is changed in parabolic shape, synchronizing with the vertical synchronizing signal; the second pin-distortion correcting circuit 35 modulates the terminal voltage V2 of the second capacitor CS2 forming a DC power source with the second pin-distortion correcting signal SP2 the signal level of which is changed in parabolic shape in inverse polarity to the first pin-distortion correcting signal SP1, synchronizing with the vertical synchronizing signal; the power source circuit 24, 36, Q3 and Q4 generates a modulating power source Vd the power voltage of which is changed by corresponding to the first pin-distortion correcting signal SP1, and supplies the driving power $V_a$ by which the signal level between the modulating power source Vd and the "0" level is switched synchronizing with the on-off operation of the first and second switching circuit 30 and 32, to the connection node between the resonance capacitor C and the horizontal deflection coil L.

Further, according to the seventh aspect of the invention, a bi-directional scan circuit comprises: the first resonance circuit supplying the deflecting current $I_{L3}$ in the going scan to a horizontal deflection coil L, the second resonance circuit supplying the deflecting current $I_{L4}$ in the returning scan to the horizontal deflection coil L, power source circuits 24, 36, Q3 and Q4 supplying a driving power $V_a$ to the first and second resonance circuits via the series circuit of a capacitor C3 and the coil L1 for power supplying, and the first and second pin-distortion correcting circuits 34 and 35 correcting the pin distortion of the horizontal deflection coil L; the first resonance circuit is a parallel resonance circuit composed of the first switching circuit 30 switching repeatedly on and off at a predetermined timing, a resonance capacitor C, the horizontal deflection coil L and the first power source capacitor CS1; the second resonance circuit is a parallel resonance circuit composed of a second switching circuit 32 switching repeatedly on and off complementarily with the first switching circuit 30, the resonance capacitor C, the horizontal deflection coil L and the second power source capacitor CS2 which has much the same capacitance as the first power source capacitor CS1; the first pin-distortion correcting circuit 34 modulates the terminal voltage V1 of the first power source capacitor CS1 with the first pin-distortion correcting signal SP1 the signal level of which is changed in a parabolic shape synchronizing with the vertical synchronizing signal; the second pin-distortion correcting circuit 35 modulates the terminal voltage V2 of the second power source capacitor CS2 with the second pin-distortion correcting signal SP2 the signal level of which is changed in a parabolic shape in inverse polarity to the first pin-distortion correcting signal SP1, synchronizing with the vertical synchronizing signal; the power circuits 24, 36, Q3 and Q4 form a modulating power source Vd with a phase shift of a predetermined phase for the first pin-distortion correcting signal SP1, in which the power voltage of which is varied corresponding to the first pin-distortion correcting signal SP1, and supplies the driving power $V_a$ which switches the signal level between the modulating power source Vd and the "0" level synchronizing with the on-off operation of the first and second switching circuit 30 and 32, to the connection node between the resonance capacitor C and the horizontal deflection coil L.

Furthermore, according to the eighth aspect of the invention, in the first and second pin-distortion correcting circuits 34 and 35, the first and second saw-tooth signals, the signal level of which varies synchronizing with the vertical synchronizing signals of inverse polarity, are superimposed to the first and second pin-distortion correcting signals SP1 and SP2 and then the signal level of the first and second pin-distortion correcting signals SP1 and SP2 are corrected; thereafter, the terminal voltages V1 and V2 of the first and second power source capacitors CS1 and CS2 are modulated.

Furthermore, according to the ninth aspect of the invention, the first switching circuit 30 is composed of a parallel circuit of the first transistor Q1 and the first diode D1; and the second switching circuit 32 is composed of a parallel circuit of the second transistor Q2 and the second diode D2.

Furthermore, according to the tenth aspect of the invention, the first and second transistors Q1 and Q2 are switched on and off based on the driving signals supplied from the predetermined driving circuits 22, 26 and 28; and the driving circuits 22, 26 and 28 supply the driving signal based on the voltage $V_L$ of the connection node between the resonance capacitor C and the horizontal deflection coil L.

Furthermore, according to the eleventh aspect of the invention, the power circuits 24, 36, Q3 and Q4 supply the modulating voltage $V_d$ to the series circuit of the third and fourth transistors Q3 and Q4; then, the third and fourth transistors Q3 and Q4 are alternately switched on and off based on the voltage $V_L$ of the connection node between the resonance capacitor C and the horizontal deflection coil L, so that the driving power $V_a$ is generated such that the signal level is switched synchronizing with the on-off operation of the first and second switching circuits 30 and 32.

In the construction of the sixth to the eleventh aspects of the invention, first and second power source capacitors CS1 and CS2 are provided in the first resonance circuit which supplies the deflecting current $I_{L3}$ in the going scan to the horizontal deflection coil L and in the second resonance circuit which supplies the deflecting current $I_{L4}$ in the returning scan to the horizontal deflection coil L; when the power source capacitors CS1 and CS2 are selected to have the same value, the deflecting current $I_{L3}$ and $I_{L4}$ in the going scan and the returning scan can be made equal.

Moreover, the terminal voltages V1 and V2 of the power source capacitors CS1 and CS2 are modulated in the shape of a parabola and the pin-distortion is corrected in addition to an "S" letter correction; and the driving power $V_a$ is formed by the modulating voltage Vd so that the power voltage varies corresponding to the first pin-distortion correcting signals SP1, and so that the display in a going and returning scan can be matched.

Here, the predetermined phase is shifted with respect to the first pin-distortion correcting signals SP1 and the modulating voltage Vd is formed so that the voltage changes in accordance with the first pin-distortion correcting signals; thus, the display picture in a going and returning scan can be matched completely.

Further, the first and second saw-tooth signals the signal level of which varies with a reversed polarity are superimposed to the first and second pin-distortion correcting signals SP1 and SP2; and then the signal levels of first and second pin-distortion correcting signals SP1 and SP2 are corrected; thereafter, by modulating the first and second power source capacitors, the displays in a going and in a returning scan can be matched with higher accuracy.

Furthermore, the first and second switching circuits 30 and 32 are composed of the parallel circuits of the first and second transistors Q1 and Q2, and the first and second diodes D1 and D2 so that the switching circuits 30 and 32 can be easily produced and the first and second resonance circuits can be switched.

Furthermore, in this operation, the on-off control is performed on the basis of the voltage $V_L$ of the connection node between the resonance capacitor C and the horizontal deflection coil L so that the switching circuits 30 and 32 can be on-off controlled certainly and easily.

In the power circuits 24, 36, Q3 and Q4, the modulating power source is connected to the series circuit of the third and fourth transistors Q3 and Q4. By the on-off operation of the third and fourth transistors Q3 and Q4 based on the voltage $V_L$ of the connection node between the resonance circuit C and the horizontal deflection coil L, the driving power can be formed so that the signal level is varied synchronizing with the on-off operation of the first and second switching circuits 30 and 32 with a simple construction.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 1A and 1B are signal waveform charts for explanation of a dual direction deflecting;

FIGS. 2A and 2B are signal waveform charts for explanation of an improvement of its deflecting current;

FIG. 3 is a connection diagram for explanation of its operating principle;

FIG. 11 is a connection diagram showing its equivalent circuit;

FIGS. 22A to 22E are signal waveform charts for explanation of its operation;

DETAILED DESCRIPTION OF THE DRAWINGS

Preferred embodiments of this invention will be described with reference to the accompanying drawings:

(1) First Embodiment

Figure 4:
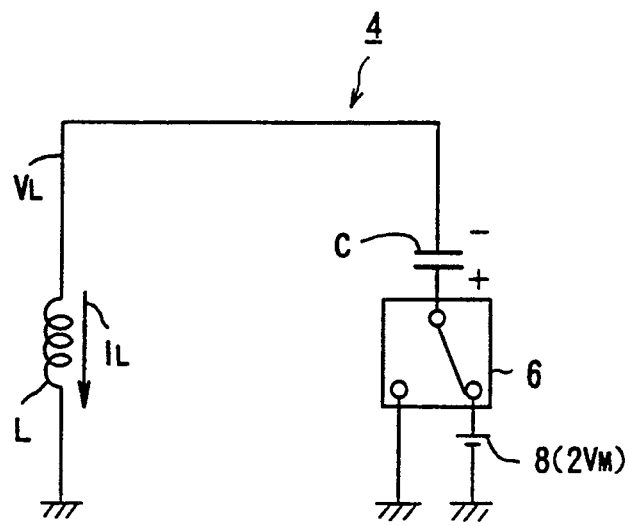
FIG. 4 is a connection diagram showing the equivalent circuit of its actual constitution.
Figure 8:
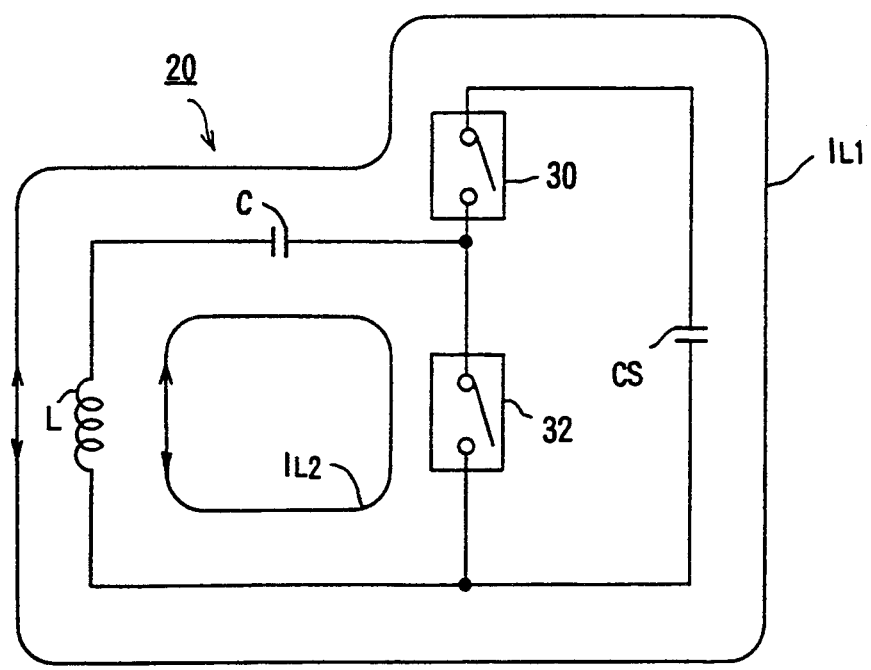
FIG. 8 is a connection diagram showing its equivalent circuit.
Figure 5:
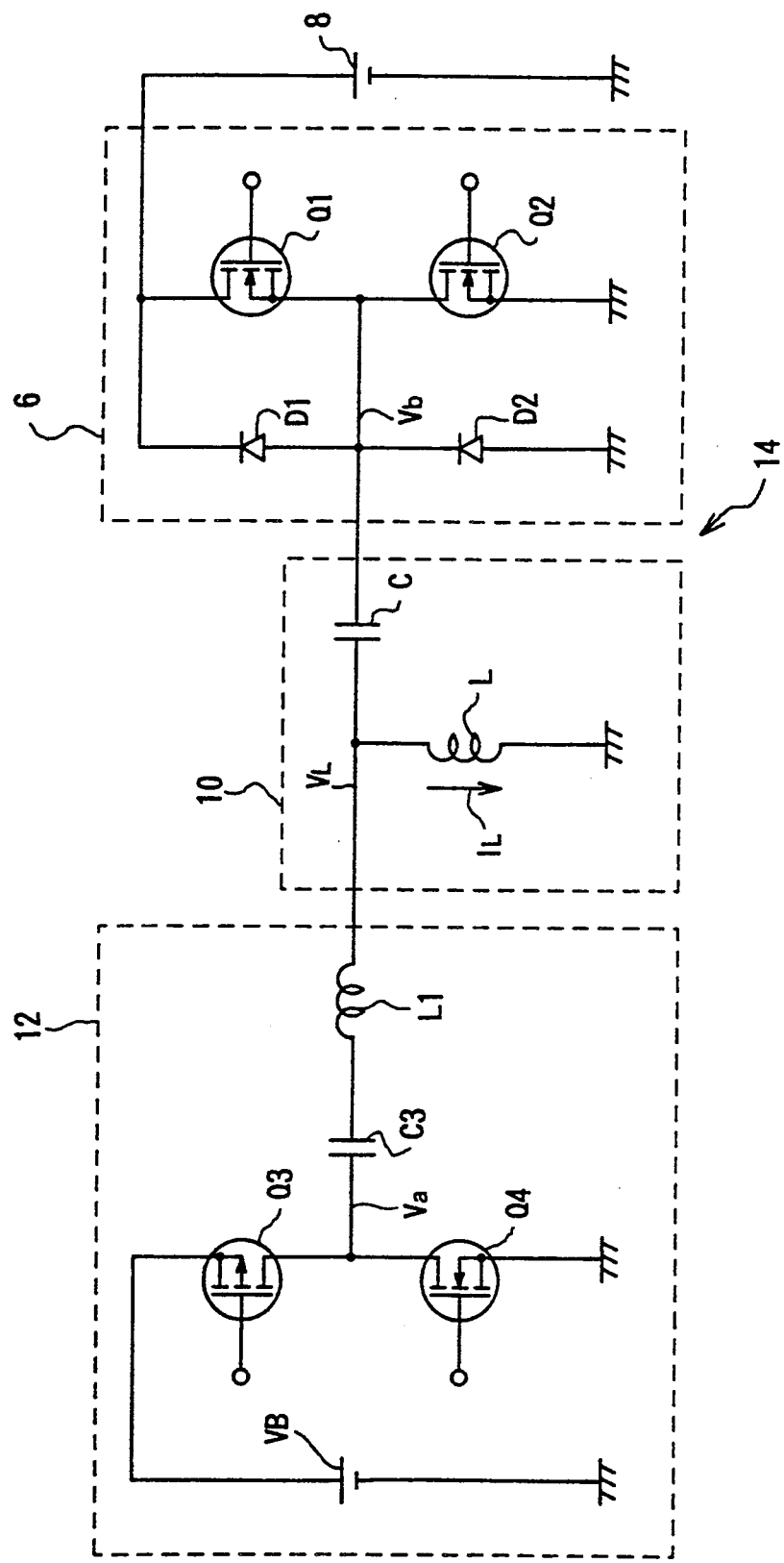
FIG. 5 is a connection diagram showing the concrete constitution.
Figure 6:
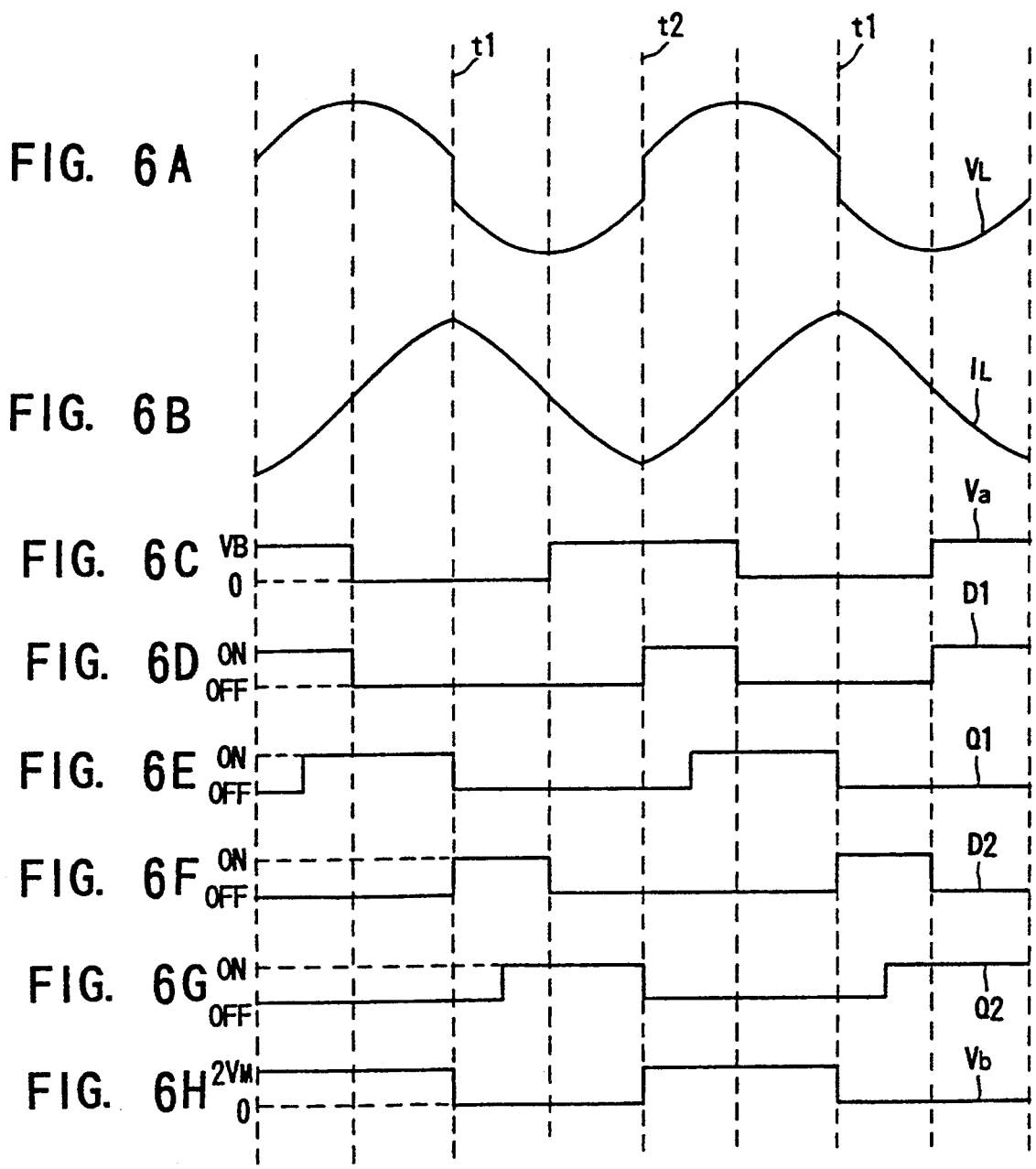
FIGS. 6A to 6H are signal waveform charts for explanation of its operation.
Figure 7:
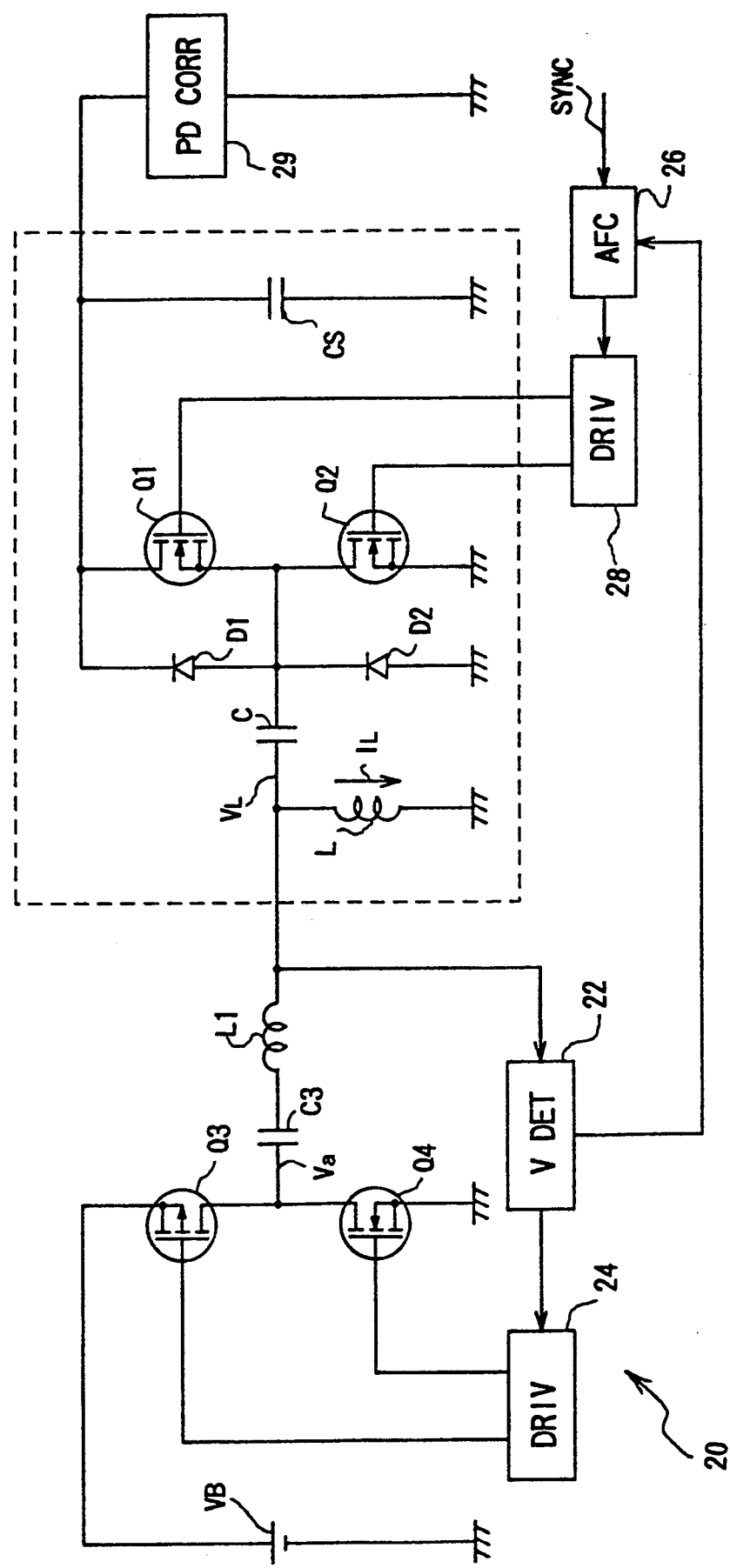
FIG. 7 is a connection diagram showing the concrete bi-directional scan circuit comprising an accompanying circuit.
Figure 9:
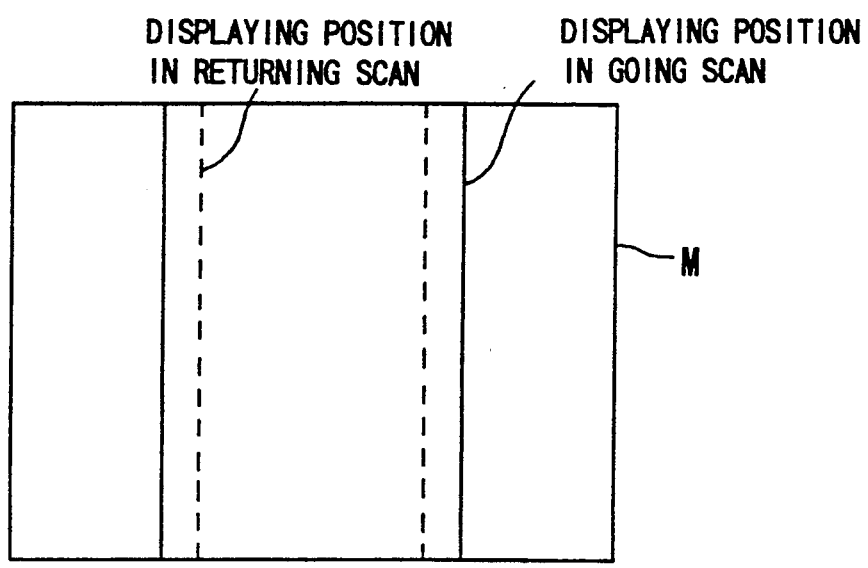
FIG. 9 is a schematic view for explanation of the deterioration of its picture quality.
Figure 10:
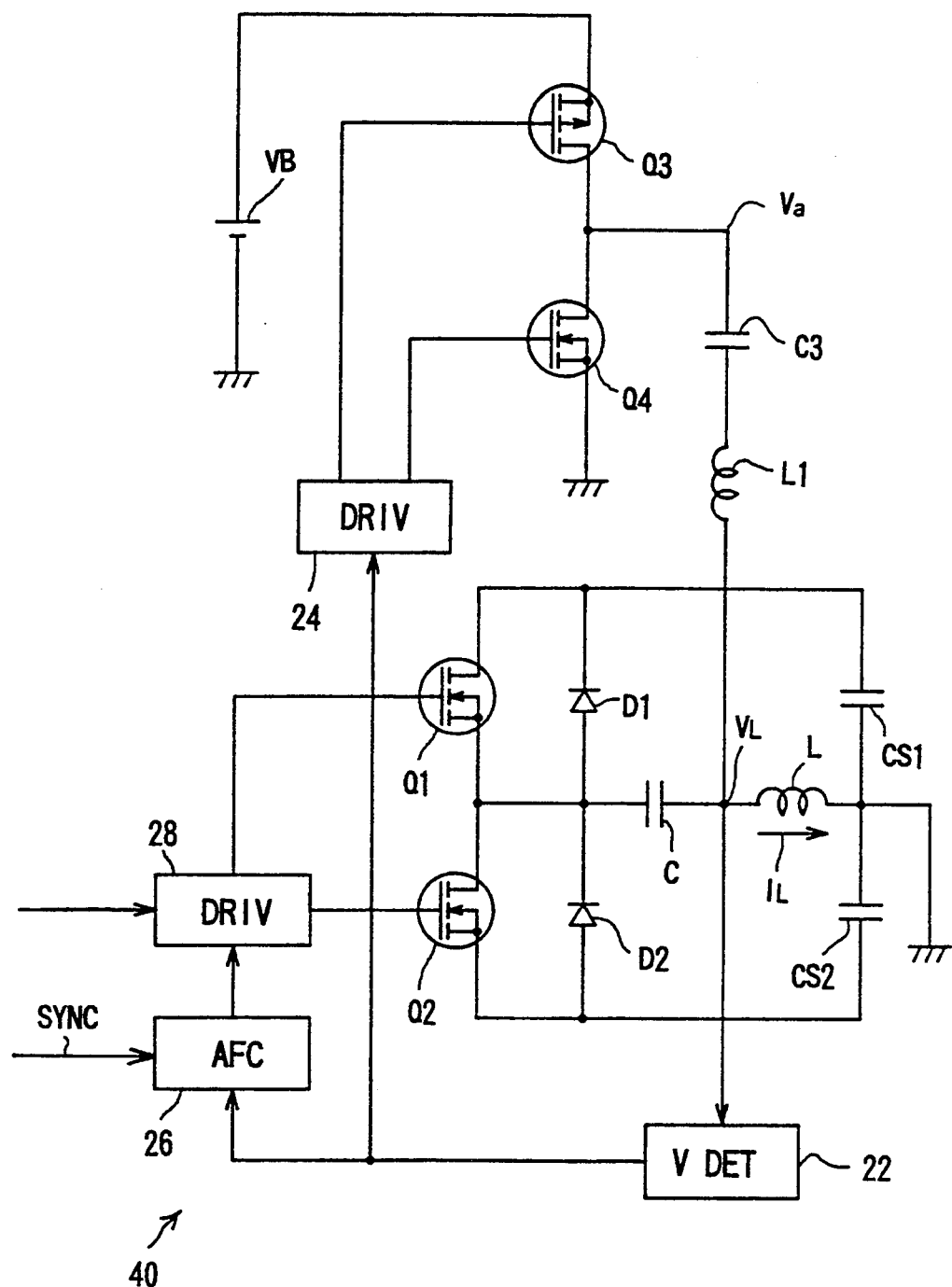
FIG. 10 is a connection diagram showing a bi-directional scan circuit according to the first embodiment of the present invention.

In FIG. 10 in which the portions corresponding to those of FIG. 7 are designated with the same reference numerals or characters, 40 Generally illustrates a deflection circuit as the bi-directional scan circuit. The capacitor CS1 is arranged in place of the capacitor CS, and in addition to this, the capacitor CS2 is provided.

That is, in the deflection circuit 40, with respect to the diodes D1 and D2 forming a portion of the first and second switching circuits, the capacitor CS1 is connected between the anode side of the diode D1 and the ground.

Further, in the deflection circuit 40, the capacitor CS2 is connected between the cathode side of the diode D2 and ground.

In this way, as shown in FIG. 11 by an equivalent circuit, the deflection circuit 40 constitutes a first resonance circuit composed of the switching circuit 30 (composed of the field-effect transistor Q1 and the diode D1), the resonance capacitor C, the deflecting coil L and the capacitor CS1. The deflection circuit 40 supplies the resonance current of the first resonance circuit as the deflecting current $I_{L3}$ in the going scan of the deflecting coil L.

On contrary, the switching circuit 32 (composed of the field-effect transistor Q2 and the diode D2) constitutes a second resonance circuit with the resonance capacitor C, the deflecting coil L and the capacitor CS2. The deflection circuit 40 supplies the resonance current of this second resonance circuit as the deflecting current $I_{L4}$ in the returning scan of the deflecting coil L.

Here, in the deflection circuit 40, the capacitances of the capacitors CS1 and CS2 are selected to be substantially the same, and small so as to correct pin-distortion easily by means of the pin-distortion correcting circuit.

As a result, in the deflection circuit 40, the deflecting currents $I_L$ in the going scan and the returning scan are much the same in frequency and the deflecting current $I_L$ can be generated so as to indicate the same changes in the going scan and in the returning scan.

Therefore, in the deflection circuit 40, the deflecting coil L is driven by the deflecting current $I_L$ so that the deterioration of the picture quality of the display can be prevented effectively. In addition, the transistors Q1 and Q2 are switched to the off state at the predetermined timing, so that the deterioration of the picture quality is prevented effectively, while the linearity can be improved without the wasteful supplying of deflecting current.

Further, by enabling the capacitance of the capacitors CS1 and CS2 to be small, a pin-distortion correcting circuit is connected so that the deterioration of the picture quality of the picture display can be corrected in a simple construction.

With the above constitution, capacitors much the same in capacitance are provided to the first and second resonance circuits, which supply the deflecting currents in the going scan and in the returning scan to the deflecting coil and the capacitors bias the deflecting voltage so that the change of the deflecting current in the going scan and the returning scan can be kept similar. As a result, the first and second resonance circuits are switched at a predetermined timing, and the deterioration of the picture quality is prevented effectively and the linearity can be improved without supplying wasteful deflecting current.

The embodiment discussed above has dealt with the case where the switching circuits 30 and 32 are composed of the field-effect transistor and the diode. However, the present invention is not limited to this but various semiconductor switching circuits, etc., can be used widely.

According to the present invention as described above, the deflecting currents in the going scan and in the returning scan are supplied to the deflecting coil by the first and second resonance circuits. Capacitors having equal capacitance are provided to the first and second resonance circuits to bias the deflecting voltage, so that the change of the deflecting current in the going scan and in the returning scan can be kept similar in simple construction.

Hence, the first and second resonance circuits are switched at a predetermined timing so that the deterioration of the picture quality is prevented effectively, while the bi-directional scan circuit, wherein linearity is improved without supplying wasteful deflecting current, can be obtained.

(2) Second Embodiment

Next, the second embodiment of the present invention will be hereinafter described.

Figure 12:
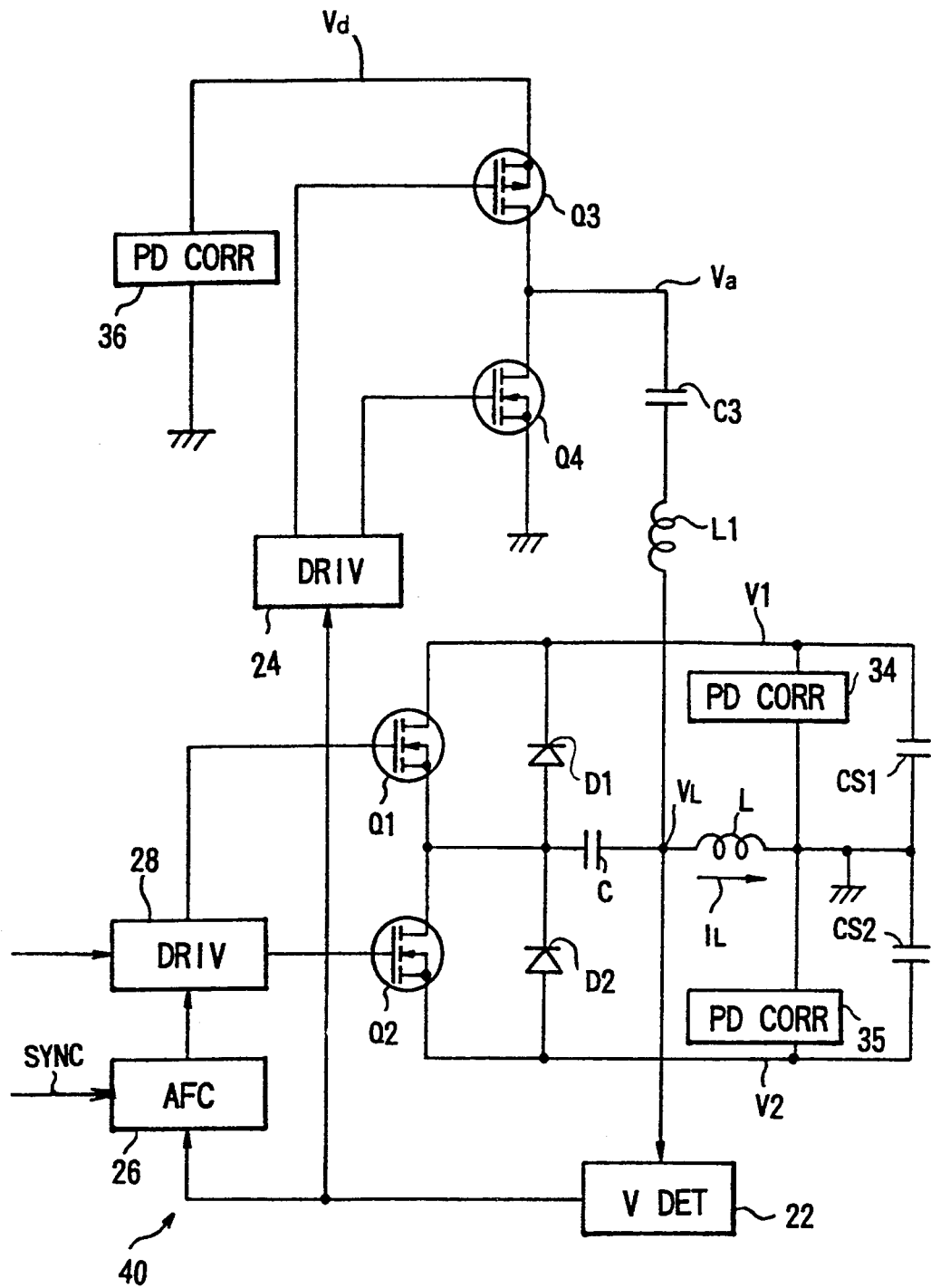
FIG. 12 is a connection diagram showing a bi-directional scan circuit according to the second embodiment of the present invention.

In FIG. 12, in which the portions corresponding to those in FIG. 10 are designated with the same reference numerals or characters, 40 generally illustrates the deflection circuit, in which the capacitor CS1 and CS2 are connected to pin-distortion correcting circuits 34 and 35 in parallel, and the transistors Q3 and Q4 connected in series are connected to a pin-distortion correcting circuit 36 in parallel.

In the deflection circuit 40 of this embodiment, by regarding the capacitors CS1 and CS2 as the power source, the sum voltage Vi+V2, which is the sum of the voltages V1 and V2 across the capacitors CS1 and CS2, vary in a parabolic shape synchronizing to the vertical synchronizing signal so as to enable the correction of pin distortion.

For this reason, in the deflection circuit 40, the voltages V1 and V2 across the capacitors CS1 and CS2 are respectively modulated in a parabolic shape, and then the sum voltage V1+V2 is varied in a parabolic shape, so as to correct pin distortion without the disturbance of the balance of the going and returning scan.

However, only varying the voltage V1 and V2 in parabolic shape causes the problem that the display picture of the going and returning scan will be displayed out of position relative to each other.

That is, if the capacitors CS1 and CS2 are not connected to the pin-distortion correcting circuits 34 and 35, it is supposed that there is no inflow and outflow of energy during a long period of observation. On the contrary, in this embodiment, the terminal voltage V1 and V2 are modulated in the above manner. As a result, it is supposed that the energy of the capacitors CS1 and CS2 is absorbed by the pin-distortion correcting circuits 34 and 35 during a long cycle.

Thus, in the deflection circuit 40, the energy balance between the deflection in the going scan and the deflection in the returning scan is disturbed and as a result, the symmetry of the raster in the going scan and the returning scan are disturbed.

Accordingly, the deflection circuit 40 modulates the power source voltage Vd by means of the pin-distortion correcting circuit 36 and the peak voltage of the driving power $V_a$ is varied in a parabolic shape and the charging current and the discharging current are supplied to the capacitors CS1 and CS2, so that the energy of the capacitors CS1 and CS2 does not fluctuate even at a short cycle.

Furthermore, the pin-distortion correcting circuits 34 through 36 enable to adjust the amount of the parabolic variation. Thus, by adjusting this variation amount, the amount of pin-distortion correction can be set to the optimum value.

Figure 13:
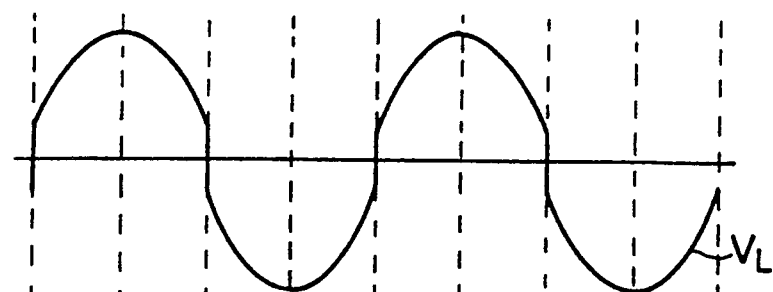
FIGS. 13A to 13B are signal waveform charts for the explanation of its operation.
Figure 13:
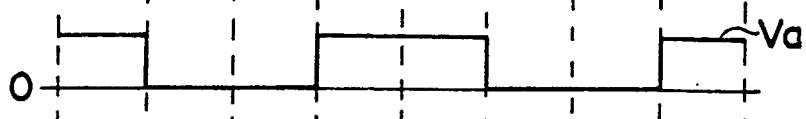
Figure 13:
Figure 13:
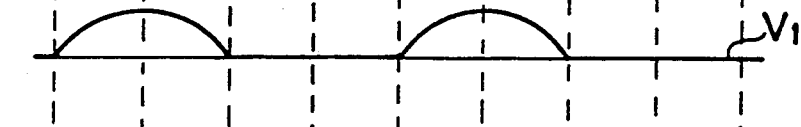
Figure 13:
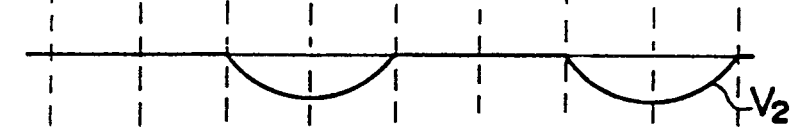
Figure 13:
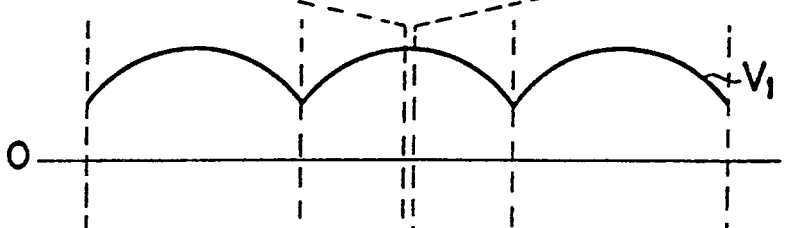
Figure 13:
Figure 13:
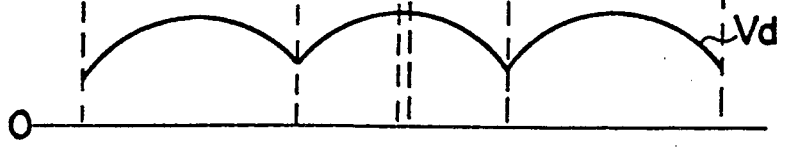

That is, as shown in FIGS. 13A to 13H, in the deflection circuit 40, the voltage $V_a$ of the driving power (FIG. 13B) rises synchronizing with the deflecting voltage $V_L$ (FIG. 13A), and in this case, the voltage $V_c$ (FIG. 13C) between the diodes D1 and D2 is synchronized with the deflecting voltage $V_L$ and rises to the voltage V1 and V2 across the capacitors CS1 and CS2 (FIGS. 13D and 13E).

The terminal voltage V1 and V2 across the capacitors CS1 and CS2, by the inflow of the charging current, synchronizes with the deflecting voltage $V_L$, the signal level of which rises in a parabolic shape from the predetermined voltage which is maintained with the pin-distortion correcting circuits 34 and 35.

The terminal voltage V1 and V2, which change with the cycle of the horizontal synchronizing signal in this way, synchronizes with the vertical synchronizing signal so as to modulate in a parabolic shape (FIGS. 13F and 13G). Moreover the power source voltage Vd (FIG. 13H) is modulated in a parabolic shape so as to vary following this terminal voltage.

Figure 14:
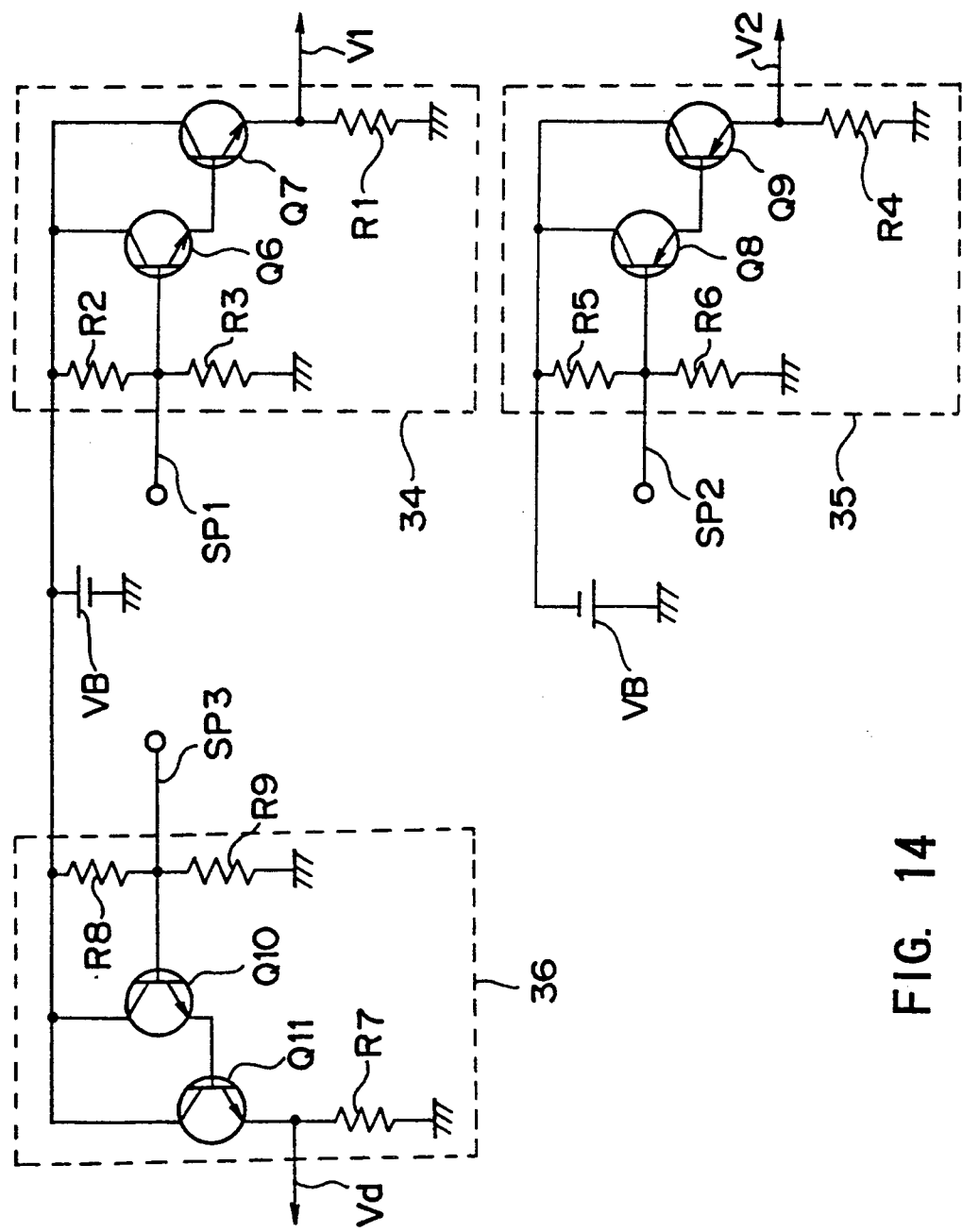
FIG. 14 is a connection diagram showing a pin-distortion correcting circuit.

For this, as shown in FIG. 14, respective pin-distortion correcting circuits 34 to 36 are composed of a series regulator circuit which is composed of transistors Q6 to Q11. Hence, in the pin-distortion correcting circuits 34 and 35, the DC level of the terminal voltage V1 and V2 across the capacitors CS1 and CS2 is kept to the DC level which is determined by the power source voltage VB and −VB and the voltage dividing resistors R2 to R6.

Further, in the pin-distortion correcting circuits 34 and 35, the connection nodes between these voltage dividing resistors receive the parabolic signals SP1 and SP2 varying each signal level complementarily so that the terminal voltages V1 and V2 across of the capacitors CS1 and CS2 are synchronized with the vertical synchronizing signal and are modulated in a parabolic shape.

On the contrary, the pin-distortion correcting circuit 36 divides the voltage of the power source voltage VB by means of the voltage dividing resistors R8 and R9 similarly. Then the DC level of the terminal voltage Vd of the field-effect transistor Q3 is kept to the value determined by the voltage dividing ratio of the voltage dividing resistors R8 and R9.

Furthermore, the pin-distortion correcting circuit 36 inputs the parabolic signal SP3, so that the signal level varies following the parabolic signal SP1, to the connection node between these voltage dividing resistors R8 and R9 so that the terminal voltage Vd is modulated with this parabolic signal SP3.

In this way, in each of the capacitors CS1 and CS2, charging caused from the driving power $V_a$ and discharging via the resistors R1 and R4 are repeated so that the unnecessary fluctuation of energy can be corrected.

Therefore, in the deflection circuit 40, the energy balance can be maintained to coincide in the going and the returning scan and the distortion of the display picture both in the going scan and the returning scan is prevented beforehand so as to correct the pin distortion.

At this time, in the deflection circuit 40, the signal levels of parabolic signals SP1 to SP3 are adjusted and the amount of correction of pin-distortion can be set to the optimum value.

With the above constitution, capacitors equal in capacitance are provided in the first and second resonance circuits, which supply the deflecting current in the going scan and the returning scan to the deflecting coil. By biasing the deflecting voltage in this capacitor, the variation of the deflecting current in the going scan and the returning scan can be kept similar. Thus, the first and second resonance circuits are switched at a predetermined timing, and the deterioration of the picture quality is prevented effectively and the linearity can be improved without supplying wasteful deflecting current.

At this time, by synchronizing to the vertical synchronizing signal and modulating the terminal voltage and the power source voltage of this capacitor in a parabolic shape, the distortion of the display in the going scan and in the returning scan is prevented beforehand and the pin distortion can be corrected.

Figure 15A:
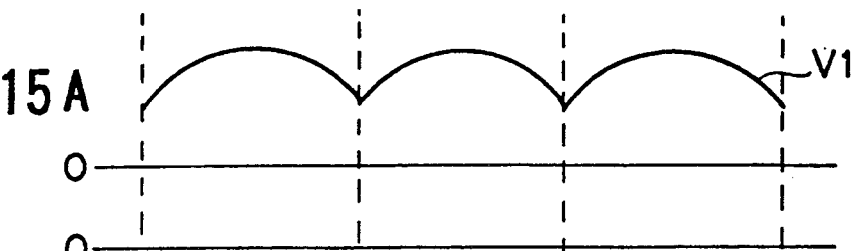
FIGS. 15A to 15C are signal waveform charts for the explanation of other embodiment that the phase is changed.
Figure 15B:
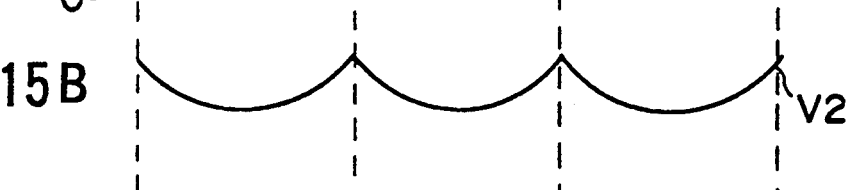
Figure 15C:
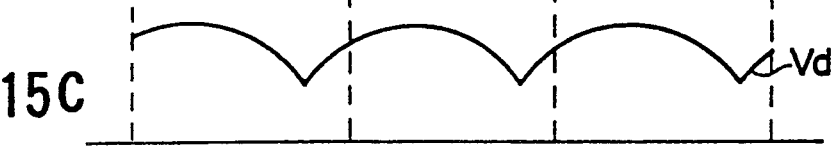

The embodiment discussed above has dealt with the case where the power source voltage is modulated following the first parabolic signal SP1. However, the present invention is not limited to this but, as shown in FIGS. 15A to 15C, the power source voltage $V_d$ may be modulated by shifting the phase with respect to the terminal voltage V1 and V2 (FIGS. 15A and 15B) of the capacitors CS1 and CS2 (FIG. 15C).

Namely, in the case of applying it to a cathode-ray tube of a large display, only modulating in a parabolic shape causes the distortion of display in the going scan and the returning scan. Therefore, by shifting the phase and modulating as mentioned above, this distortion can be prevented completely.

Figure 16:
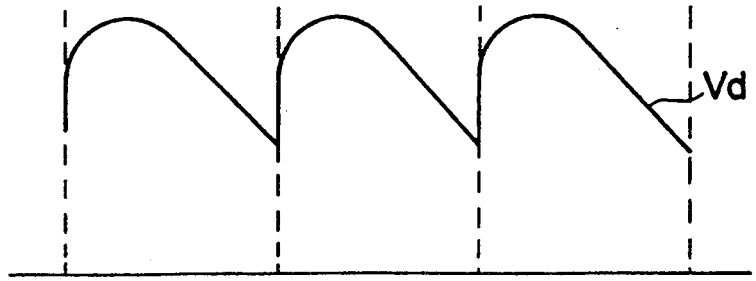
FIG. 16 is a signal waveform chart for the explanation of other embodiment that the saw-tooth signals is superimposed.

Further, as shown in FIG. 16, the saw-tooth signals may be superimposed to the parabolic signals in place of the change of the phase so that the distortion may be corrected.

Furthermore, the embodiment described above has dealt with the case where the switching circuits 30 and 32 are composed of field-effect transistors and diodes. However, the present invention is not limited to this but various semiconductor switching circuits, etc. may widely be used.

According to the present invention described above, the deflecting current in the going scan and the returning scan are supplied to the deflecting coil by the first and second resonance circuits. Capacitors having equal capacitance are provided to the first and second resonance circuits to bias the deflecting voltage, so that the linearity may be improved without supplying wasteful deflecting current.

At this time, there may be produced the bi-directional scan circuit, in which the terminal voltage and the power source voltage across this capacitor are synchronized to the vertical synchronizing signal to vary in a parabolic shape, so that the distortion of display in the going scan and in the returning scan is prevented beforehand forming a display picture.

Next, a vertical deflection circuit applied to the embodiment mentioned above will be described.

Figure 17:
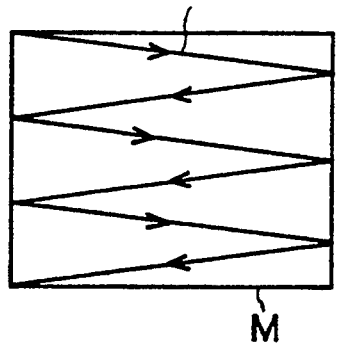
FIG. 17 is a schematic view for the explanation of pairing.

In this type of a vertical deflection circuit, if each display picture is formed in the going scan and in the returning scan and a vertical deflection coil is driven by only saw-tooth signal, as shown in FIG. 17, the scanning lines in the going scan and in the returning scan are not arranged in parallel on the display M and are superimposed at the corner of the display picture M (that is, this is a pairing).

Figure 18:
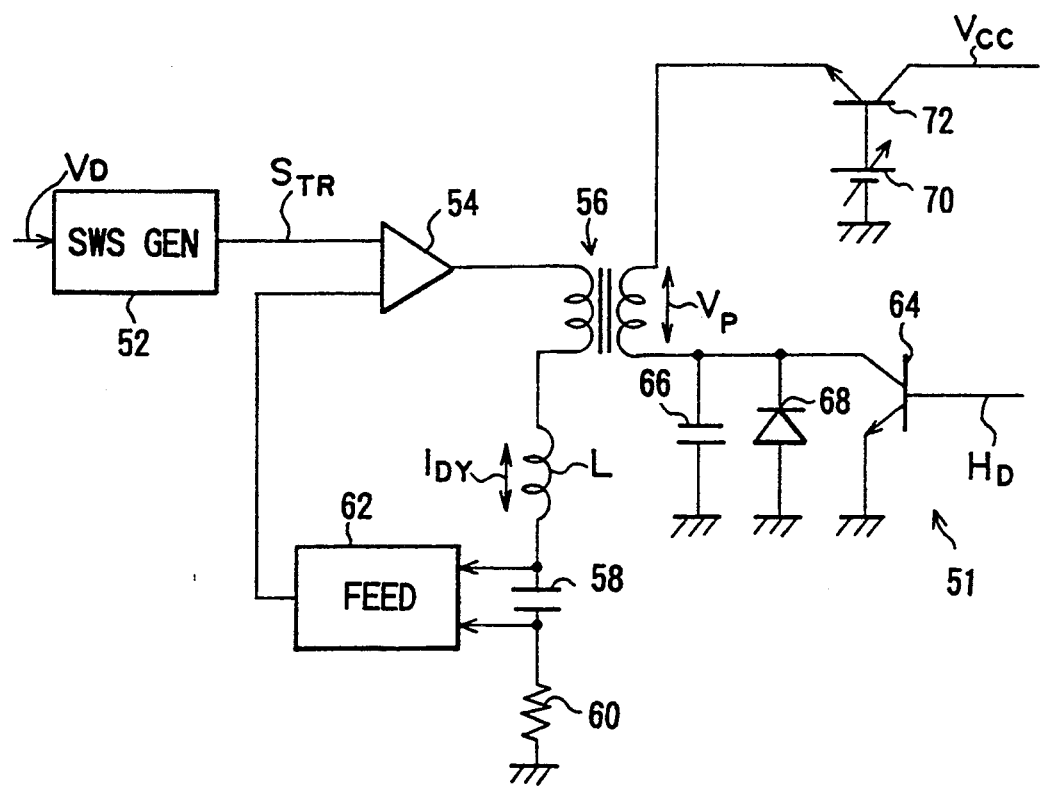
FIG. 18 is a block diagram showing the conventional vertical bi-directional scan circuit.

Hence, as shown in FIG. 18, there has been proposed a deflection circuit 1 (Japanese Patent Application Laid Open No. 145378/1991) in which the current value of the vertical deflecting current, is modulated into the saw-tooth wave synchronizing with the horizontal synchronizing signal so that the generation of the pairing is prevented previously.

The deflection circuit 51 supplies a vertical synchronizing signal VD to a saw-tooth wave signal generating circuit 52 in which the saw-tooth wave signal $S_{TR}$ is formed so that the signal level is varied into the saw-tooth waved shape synchronizing with the vertical synchronizing signal.

An amplifier circuit 54 is composed of the low-impedance output power amplifier circuit of a differential amplifier circuit type and the saw-tooth wave signal $S_{TR}$ is inputted to a non-inverting input side, and at the same time, its output signal is grounded via the primary coil of a transformer 56, the vertical deflecting coil L, a capacitor 58 for correcting "S" letter and the resistor 60.

A feedback circuit 62 detects the terminal voltage across the capacitor 58 for correcting "S" letter and then feeds back the detected result to the inverting input of the amplifier circuit 54. Therefore, the deflection circuit 51 drives the vertical deflecting coil L so that the current value is varied following the signal level of the saw-tooth wave signal $S_{TR}$.

Further, the deflection circuit 51 connects in series the capacitor 58 for correcting "S" letter into the vertical deflecting coil L, and at the same time, detects its terminal voltage and forms the feedback group so as to correct the "S" letter distortion of the display.

Furthermore, the deflection circuit 51 forms the horizontal synchronizing signal $H_D$ so that the signal level arises at the starting timing of each scan in the going scan and in the returning scan and supplies the horizontal synchronizing signal $H_D$ to the transistor 64 of the emitter ground type. The transistor 64 connects a collector output into the secondary coil of a transformer 56 and grounds in parallel with a resonance capacitor 66 and a damping diode 68.

Furthermore, the deflection circuit 51 connects the power source voltage $V_{CC}$ into the secondary coil of the transformer 56 via the series regulator circuit composed of the reference power source 70 and a transistor 72. Hence, the driving power source of the predetermined voltage is supplied to the transistor 64.

In the transistor 64, the voltage $V_P$ across the secondary coil of the transformer 56 rises to a pulse shape synchronizing with the horizontal synchronizing signal and the current on the secondary coil side of the transformer 56 is varied to saw-tooth wave synchronizing with the horizontal synchronizing signal.

Hence, the deflection circuit 51 corrects the current value of the vertical deflecting current $I_{DY}$ to change like steps and drives the vertical deflecting coil L with the vertical deflecting current $I_{DY}$ so as to prevent the generation of pairing previously.

However, in the deflection circuit 51, there is the problem that this circuit is still insufficient for practical use because parallel and uniform scanning lines are not formed with respect to the whole display picture.

Figure 19A:
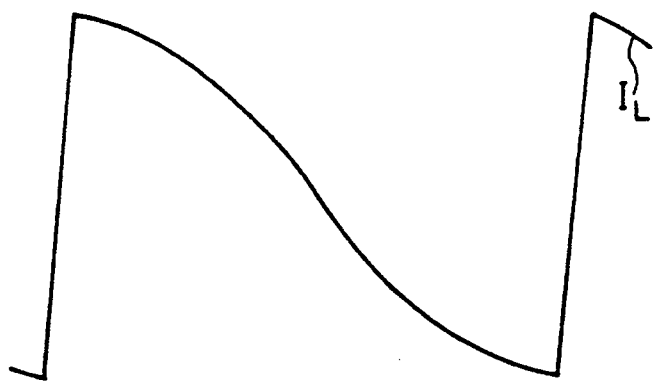
FIGS. 19A to 19C are signal waveform charts for the explanation of its operation thereof.
Figure 19B:
Figure 19C:
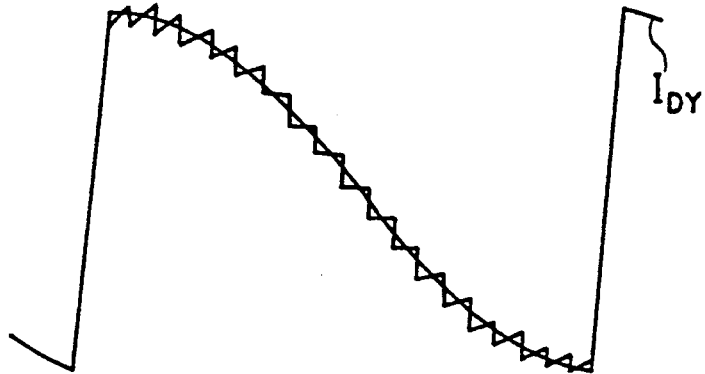

That is, as shown in FIGS. 19A to 19C, in the case when the vertical deflecting coil L and the "S" letter capacitor 58 are connected in series and "S" letter is corrected, in the vertical deflecting current $I_L$ (FIG. 19A), the current value is varied slowly at a scanning start side and a scanning end side.

If the current value of the vertical deflecting current $I_L$ is corrected by the saw-tooth wave signal S1 (FIG. 19B) synchronizing with the horizontal synchronizing signal (FIG. 19C), in the deflecting current $I_{DY}$ after correction, the current value is also corrected at the top and bottom side.

Figure 20:
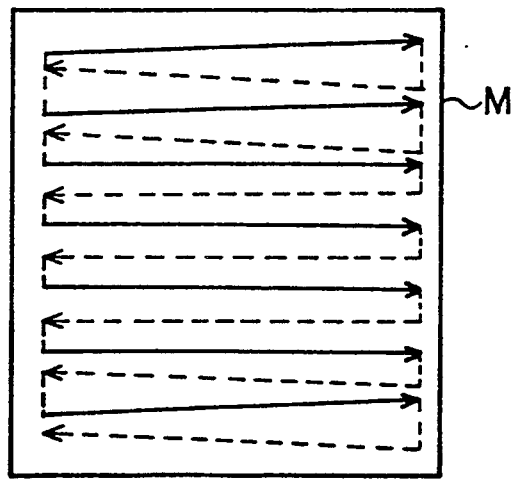
FIG. 20 is a schematic diagram for explanation of the distortion of the scanning line.

For this reason, as shown in FIG. 20, in the display picture M, the scanning line is inclined and formed at the top and bottom side, and accordingly the scanning line can not be formed uniformly and the resolution is diminished.

To solve the above problems, the embodiments, which enable forming the scanning line uniformly and are used for the vertical deflection circuit of the dual direction vertical bi-directional scan circuit, will be described as follows.

Based on the drawings, one embodiment of the vertical deflection circuit applied to the dual direction bi-directional scan circuit in the present invention will be hereinafter described with reference to the accompanying drawings.

Figure 21:
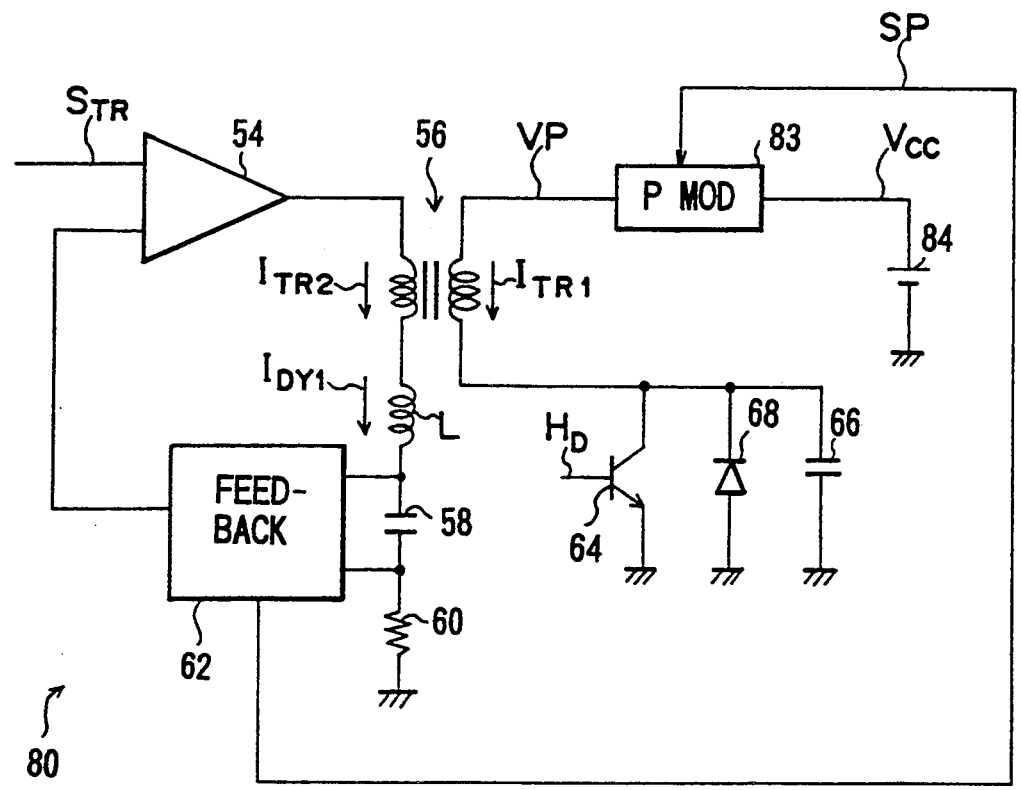
FIG. 21 is a block diagram showing a vertical bi-directional scan circuit applied to the embodiment of the present invention.

Referring to FIG. 21 in which the portions corresponding to those of FIG. 18 are designated with the same reference numerals or characters, 80 illustrates as a whole the deflection circuit, in which the terminal voltage across the "S" letter correcting capacitor 58 is detected via the feedback circuit 62 and the detected result is fed back to the amplifier circuit 54 so that the "S" letter distortion on the display picture is corrected and the vertical deflecting coil L is driven.

Further, as shown in FIGS. 22A to 22E, the feedback circuit 22 detects the potential difference across the "S" letter correcting capacitor 58 so as to form the parabolic signal SP (FIG. 22A) so that the signal level is varied following the potential difference across thereof (in FIGS. 22A to 22E, a period "V" represents the 1 vertical scanning cycle.).

The power modulating circuit 83 modulates the DC power source $V_{CC}$ outputted from the predetermined power source circuit 84 with the parabolic signal SP. Hence, the modulating power VP is formed (FIG. 22B) so that the voltage is varied in parabolic shape from the predetermined direct-current level and the modulating power source VP is outputted to the transformer 56.

Figure 23:
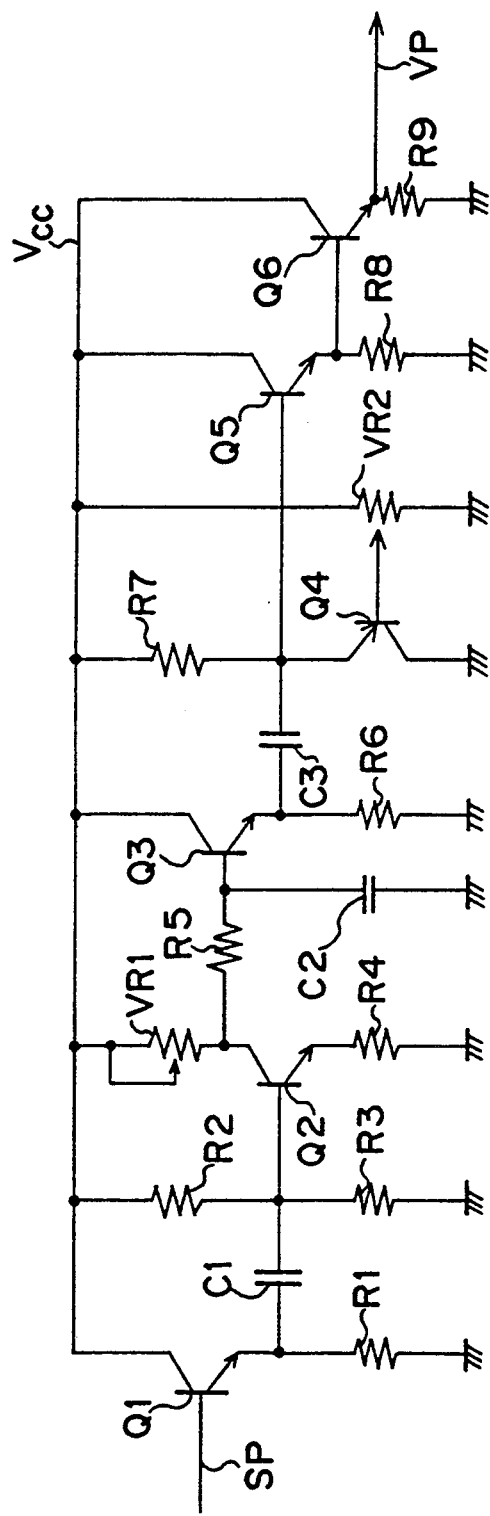
FIG. 23 is a connection diagram showing a power modulating circuit.

That is, as shown in FIG. 23, in the power modulating circuit 83, the parabolic signal SP is inputted into a buffer circuit composed of the resistor R1 and the transistor Q1, an emitter output of which is outputted into the transistor Q2 via a coupling capacitor C1.

The transistor Q2 forms the emitter ground type amplifier circuit of the predetermined gain with the resistors R2 to R4 and a semi-fixed resistor VR1, and adjusts the semi-fixed resistor VR1 to adjust the gain.

Hence, the power modulating circuit 83 modulates the parabolic signal SP by the transistor Q2, and then eliminates the noise components mixed from the horizontal deflection coil, etc., at the low-pass filter circuit of the resistor R5 and the capacitor C2.

Further, the power modulating circuit 83 supplies the output signal of the low-pass filter circuit to the transistor Q3, in which the transistor Q3 forms the buffer circuit with the resistor R3.

Hence, the power modulating circuit 83 eliminates noise components from the parabolic signal SP and then outputs to the transistor Q5 via transistor Q3 and the coupling capacitor C3.

The transistor Q5 forms the DC buffer circuit of the emitter follower circuit constituted with the transistor Q6 and the resistors R8 and R9, and its base electric potential is set to a voltage determined by the resistor R7, the semi-fixed resistor VR2 and the transistor Q4.

Hence, in the power modulating circuit 83, the DC clamping circuit is composed of the transistors Q4 to Q6, the resistors R7 to R9 and the semi-fixed resistor VR2. The driving power VP is generated so that the AC level is varied following the parabolic signal SP in the DC level determined by the semi-fixed resistor VR2.

Thus, the deflection circuit 80 supplies the driving power VP to the transistor 64 via the secondary coil of the transformer 56, and forms the correcting current $I_{TR1}$ (FIG. 22C) so as to vary in the saw-tooth shape synchronizing the horizontal synchronizing signal $H_D$ and similarly so that the whole amplitude is varied into the parabolic shape following the vertical synchronizing signal. Hence, the deflection circuit 80 superimposes the correcting current $I_{TR1}$ to the primary current $I_{TR2}$ of the transformer 6 (FIGS. 22D and 22E) via the transformer 6.

Hence, in the deflection circuit 80, the amplitude of the correcting current $I_{TR1}$ can be made smaller at the top and bottom side of the display picture, and in superimposition on the primary current $I_{TR2}$ of the transformer 56, the amount of correction can be reduced at the top and bottom side of the display picture by adjusting the semi-fixed resistor VR1.

Thus, in the deflection circuit 80, the amount of correction can be varied following the variation of the vertical deflecting current varying by "S" letter correcting, and the deflecting current $I_{DY}$ of the vertical deflection coil L can be corrected so that the current value is varied in like steps over a whole picture.

Figure 24:
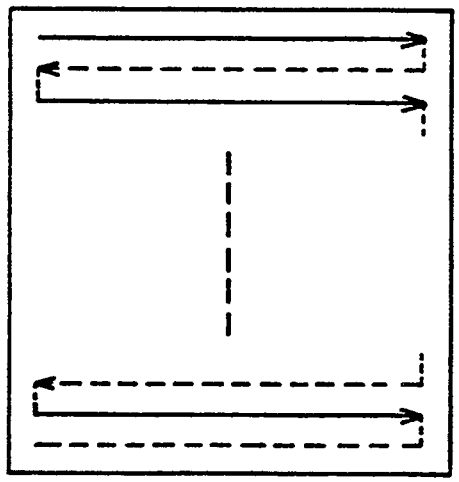
FIG. 24 is a schematic view illustrating the distribution of a scanning line.

Therefore, as shown in FIG. 24, in the deflection circuit 80, the over-correction of the vertical deflecting current is prevented previously even in the top and bottom sides of the picture, and the uniform and parallel scanning line can be formed as a whole display picture.

With the above constitution, the amplitude of the saw-tooth wave signal synchronizing with the horizontal synchronizing signal is modulated with the parabolic signal synchronizing with the vertical synchronizing signal to form the correcting signal. This correcting signal is superimposed on the vertical deflecting current so as to correct the vertical deflecting current so that the current value is varied like steps. Thus, the amount of correction can be varied in accordance with the variation of the vertical deflecting current changing by "S" letter correcting. As a result, the uniform and parallel scanning line can be formed over a whole display picture.

The embodiments discussed above have dealt with the case where the parabolic signal is formed across the "S" letter correcting capacitor. However, the present invention is not limited to this but the parabolic signal can be formed by double integrating the vertical synchronizing signal.

Further, the embodiments described above have dealt with the case where the correcting signal is current-added by using the transformer 56. However, the present invention is not limited to this but the correcting signal may be current-added at the input side of, for example, the amplifier circuit 54.

According to the present invention described above, the saw-tooth wave signal synchronizing with the horizontal synchronizing signal is modulated by the parabolic signal synchronizing with the vertical deflecting signal, and then the vertical deflecting current is corrected by the raster correcting signal obtained from its result so that the amount of correction can be varied following the variation of the vertical deflecting current varying by the "S" letter correction. Thus, the bi-directional scan circuit, which can form the uniform and parallel scanning line over a whole display picture, can be obtained.

While there has been described in connection with the preferred embodiments of the invention, it will be obvious to those skilled in the art that various changes and modification may be made. It is aimed, therefore, to cover in the appended claims all such changes and modifications as fall within the true spirit and scope of the invention.

What is claimed is:

1. A bi-directional scan circuit comprising:
a first resonance circuit comprising a series resonance circuit which comprises a first switching circuit switching on and off repeatedly at a predetermined timing, a resonance capacitor, a horizontal deflection coil, and a first capacitor forming a DC power source, and which supplies a going scan deflecting current to said horzontal deflection coil; and
a second resonance circuit comprising a series resonance circuit which comprises a second switching circuit switching on and off repeating with said first switching circuit complementarily, said resonance capacitor, said horizontal deflection coil and a second capacitor forming a DC power source, and which supplies a returning scan deflecting current to said horizontal deflection coil; wherein:
said first capacitor for forming a DC power source and said second capacitor for forming a DC power source are substantially set to an equal value; and
said first switching circuit is set to repeat the on-off operation with less than ½ cycle with respect to one cycle of the resonance frequency of said first and second resonance circuits.

2. A bi-directional scan circuit according to claim 1 wherein:
said first switching circuit comprises a parallel circuit which comprises a first transistor and a first diode, and
said second switching circuit comprises a parallel circuit which comprises a second transistor and a second diode.

3. A bi-directional scan circuit according to claim 2 wherein:
said first and second transistors switch on and off based on the driving signal outputted from a predetermined driving circuit, and
said driving circuit outputs said driving signal on the basis of the voltage of a connection node between said resonance capacitor and said horizontal deflection coil.

4. A bi-directional scan circuit according to claim 1, 2, or 3 wherein:
said first and second resonance circuits input driving power into the connection node between said resonance capacitor and said horizontal deflection coil from a predetermined power circuit via a capacitor and a coil, and
in said driving power, a signal level changes in synchronism with the on-off operation of said first and second switching circuits.

5. A bi-directional scan circuit according to claim 4 wherein:
said power circuit connects in series third and fourth transistors to a ground from a direct-current power source, and
said power circuit switches on and off for said third and fourth transistors alternately on the basis of the voltage of the connection node between said resonance capacitor and said horizontal deflection coil so as to form said driving power so that the signal level changes in synchronism with the on-off operation of said first and second switching circuits.

6. A bi-directional scan circuit comprising:
a first resonance circuit comprising a series resonance circuit which comprises a first switching circuit switching on and off repeatedly at a predetermined timing, a resonance capacitor, a horizontal deflection coil and a first capacitor for forming a DC power source, and which supplies a going scan deflecting current to said horizontal deflection coil;
a second resonance circuit comprising a series resonance circuit which comprises a second switching circuit switching on and off repeatedly with said first switching circuit complementarily, said resonance capacitor, said horizontal deflection coil and said second capacitor for power supplying having substantially the same capacitance as said first capacitor for supplying power, and which supplies a returning scan deflecting current to said horizontal deflection coil;
a power circuit supplying driving power to said first and second resonance circuits via a series circuit of a capacitor and a coil;
a first pin-distortion correcting circuit modulating the terminal voltage of said first capacitor for forming a direct-current power source with the first pin distortion correcting signal whose signal level varies in synchronism with the vertical synchronizing signal in parabolic shape; and
a second pin-distortion correcting circuit modulating the terminal voltage of said second capacitor for forming a DC power source with the second pin-distortion signal which has an inverse polarity with respect to said first pin-distortion correcting signal and varies the signal level in a parabolic shape in synchronism with said vertical synchronizing signal; wherein said power circuit generates a modulating power source, so that its power voltage is varied by following said first pin-distortion correcting signal, and supplies said driving power, and so that the signal level is switched between said modulating power source and a "0" level in synchronism with the on-off operation of said first and second switching circuits, and is transmitted to a connection node between said resonance capacitor and said horizontal deflection coil.

7. A bi-directional scan circuit comprising:

a first resonance circuit comprising a series resonance circuit which comprises a first switching circuit switching on and off repeatedly at a predetermined timing, a resonance capacitor, a horizontal deflection coil and a first capacitor for forming a DC power source, and which supplies a going scan deflecting current to said horizontal deflection coil;

a second resonance circuit comprising a series resonance circuit which comprises a second switching circuit switching on and off repeatedly with said first switching circuit complementarily, said resonance capacitor, said horizontal deflection coil and said second capacitor for power supplying having substantially the same capacitance as said first capacitor for supplying power, and which supplies a returning scan deflecting current to said horizontal deflection coil;

a power circuit supplying driving power to said first and second resonance circuits via a series circuit of a capacitor and a coil;

a first pin-distortion correcting circuit modulating the terminal voltage of said first capacitor for forming a DC power source with the first pin-distortion correcting signal whose signal level changes in synchronism with the vertical synchronizing signal in a parabolic shape; and a second pin-distortion correcting circuit modulating the terminal voltage of said second capacitor for forming a DC power source with the second pin-distortion signal which has an inverse polarity with respect to said first pin-distortion correcting signal and varies the signal level in a parabolic shape in synchronism with said vertical synchronizing signal; wherein said power circuit generates a modulating power source, so that its power voltage is varied by following said first pin-distortion correcting signal with a phase which is shifted as much as a predetermined phase from the phase of said first pin-distortion correcting signal, and supplies said driving power, and so that the signal level is switched between said modulating power source and a "0" level in synchronism with the on-off operation of said first and second switching circuits, and is transmitted to a connection node between said resonance capacitor and said horizontal deflection coil.

8. A bi-directional scan circuit according to claim 6 in which:

said first and second pin-distortion correcting circuits superimpose first and second saw-tooth signals wherein the signal level varies in synchronism with the vertical synchronizing signal with an inverse polarity, to said first and second pin-distortion correcting signals so that the signal level of said first and second pin-distortion correcting signals are corrected, and thereafter, the terminal voltage of said first and second capacitors for forming a direct-current power source is modulated.

9. A bi-directional scan circuit according to any of claims 6, 7 and 8 wherein:

said first switching circuit comprises a parallel circuit which comprises a first transistor and a first diode, and said second switching circuit comprises a parallel circuit which comprises a second transistor and a second diode.

10. A bi-directional scan circuit according to claim 9 wherein:

said first and second transistors switch on and off based on the driving signal outputted from a predetermined driving circuit, and said driving circuit outputs said driving signal on the basis of the voltage of the connection node between said resonance capacitor and said horizontal deflection coil.

11. A bi-directional scan circuit according to claim 10 in which:

said power circuit supplies said modulating power source to a series circuit comprising third and fourth transistors, and said power circuit switches on and off said third and fourth transistors alternately on the basis of the voltage of the node between said resonance capacitor and said horizontal deflection coil, so that said driving power is formed so that the signal level changes in synchronism with the on-off operation of said first and second switching circuits.

* * * * *